(12) United States Patent
Sugawara

(10) Patent No.: US 11,327,697 B2
(45) Date of Patent: May 10, 2022

(54) INFORMATION PROCESSING APPARATUS AND STARTUP METHOD FOR INPUT-OUTPUT DEVICE

(71) Applicant: CANON KABUSHIKI KAISHA, Tokyo (JP)

(72) Inventor: Kazuhiro Sugawara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/950,515

(22) Filed: Nov. 17, 2020

(65) Prior Publication Data

US 2021/0157536 A1 May 27, 2021

(30) Foreign Application Priority Data

Nov. 27, 2019 (JP) .............................. JP2019-214509

(51) Int. Cl.
*G06F 3/12* (2006.01)
*G10L 15/08* (2006.01)
*G06F 3/16* (2006.01)

(52) U.S. Cl.
CPC .......... *G06F 3/1253* (2013.01); *G06F 3/1221* (2013.01); *G06F 3/1287* (2013.01); *G06F 3/16* (2013.01); *G10L 15/08* (2013.01); *G10L 2015/088* (2013.01)

(58) Field of Classification Search
CPC .... G06F 3/1253; G06F 3/1221; G06F 3/1287; G06F 3/16; G10L 15/08
USPC .......................................................... 358/400
See application file for complete search history.

(56) References Cited

U.S. PATENT DOCUMENTS

| 2019/0206412 | A1* | 7/2019 | Li ....................... H04L 12/2816 |
| 2019/0371342 | A1* | 12/2019 | Tukka ............... H04W 52/0254 |
| 2020/0051554 | A1* | 2/2020 | Kim ...................... G06F 3/167 |
| 2020/0177746 | A1* | 6/2020 | Katsumata ............. G10L 15/26 |

FOREIGN PATENT DOCUMENTS

JP 2019095520 A 6/2019

\* cited by examiner

*Primary Examiner* — Allen H Nguyen
(74) *Attorney, Agent, or Firm* — Canon U.S.A., Inc. IP Division

(57) ABSTRACT

An information processing apparatus communicating with an input-output device that receives an input voice, outputs voice data corresponding to the input voice, and communicates with a server that analyzes the output voice data. The information processing apparatus further includes a voice output unit configured to output a voice, a reception unit configured to receive a user operation for starting the input-output device, and a control unit configured to perform control to, in response to the user operation received by the reception unit, cause the voice output unit to output a waking word for starting the input-output device.

19 Claims, 24 Drawing Sheets

FIG.7Ba

| GROUP ID | VOICE RECOGNITION RESULT | |
| --- | --- | --- |
| | KANA | AFTER KANA-KANJI CONVERSION |
| OPR00000 | ソウサ | 操作 |
| OPR00001 | タッチ | |
| | タップ | |
| | オス | 押す |
| | オウカ | 押下 |
| | クリック | |
| OPR00002 | ロングタッチ | |
| | ロングタップ | |
| | ナガオシ | 長押し |
| OPR00003 | スワイプ | |
| OPR00004 | スライド | |
| OPR00005 | スクロール | |
| OPR00010 | オーケー | OK |
| | オッケー | |
| | カクテイ | 確定 |
| | ケッテイ | 決定 |
| | キマリ | 決まり |
| OPR00011 | カイシ | 開始 |
| | スタート | |
| | ハジメ | 始め |
| OPR00012 | シュウリョウ | 終了 |
| | オワリ | 終わり |
| | カンリョウ | 完了 |
| OPR00013 | キャンセル | |
| | チュウシ | 中止 |
| OPR00014 | テイシ | 停止 |
| | ポーズ | |
| OPR00020 | トジル | 閉じる |
| | トジテ | 閉じて |
| | クローズ | |
| OPR00021 | キドウ | 起動 |

JAPANESE TEXT

| OPR00040 | センタク | 選択 |
| --- | --- | --- |
| | セッテイ | 設定 |
| | シテイ | 指定 |
| OPR00041 | ヘンコウ | 変更 |
| | ヘンシュウ | 編集 |
| OPR00042 | ホセイ | 補正 |
| | シュウセイ | 修正 |
| | チョウセイ | 調整 |
| OPR00043 | サクジョ | 削除 |
| | ケシ | 消し |
| | ケス | 消す |
| | ショウキョ | 消去 |
| | ジョキョ | 除去 |
| | ナクス | なくす |
| | ナクシテ | なくして |
| | カット | |
| OPR00044 | カイジョ | 解除 |
| | クリア | |
| OPR00045 | リセット | |
| | ヤリナオシ | やり直し |

JAPANESE TEXT

FIG.7Bb

| GROUP ID | VOICE RECOGNITION RESULT | |
|---|---|---|
| | KANA | AFTER KANA-KANJI CONVERSION |
| FNC00000 | キノウ | 機能 |
| | ファンクション | |
| FNC00001 | コピー | |
| | フクシャ | 複写 |
| | フクセイ | 複製 |
| FNC00002 | インサツ | 印刷 |
| | プリント | |
| FNC00003 | スキャン | |
| | ヨミトリ | 読み取り |
| | ヨミコミ | 読み込み |
| FNC00004 | ホゾン | 保存 |
| | ホカン | 保管 |
| | カクノウ | 格納 |
| | ノコス | 残す |
| | ホールド | |
| | キロク | 記録 |
| | カキコミ | 書き込み |
| FNC00005 | ソウシン | 送信 |
| | センド | |
| FNC00006 | ジュシン | 受信 |
| | レシーブ | |
| FNC00007 | スプール | |
| | タマッテ | 溜まって |
| FNC00008 | ショウカイ | 紹介 |
| | ヘルプ | |
| | ガイド | |
| | イントロ | |
| FNC00009 | オンセイニンシキ | 音声認識 |
| FNC00010 | ログイン | 認証 |

⟵ JAPANESE TEXT

| GROUP ID | VOICE RECOGNITION RESULT | |
|---|---|---|
| | KANA | AFTER KANA-KANJI CONVERSION |
| NUM00000 | ゼロ | 0, 零 |
| | レイ | 0, 零 |
| | ゼロバン | 0番, 零番 |
| | レイバン | 0番, 零番 |
| NUM00001 | イチ | 1, 一 |
| | イチバン | 1番, 一番 |
| | ヒトツメ | 1つ目, 一つ目 |
| NUM00002 | ニ | 2, 二 |
| | ニバン | 2番, 二番 |
| | フタツメ | 2つ目, 二つ目 |
| NUM00003 | サン | 3, 三 |
| | サンバン | 3番, 三番 |
| | ミッツメ | 3つ目, 三つ目 |
| NUM00004 | ヨン | 4, 四 |
| | ヨンバン | 4番, 四番 |
| | ヨッツメ | 4つ目, 四つ目 |
| ... | | |
| NUM99999 | キュウマンキュウセンキュウヒャクキュウジュウキュウ | 99999, 九万九千九百九十九 |
| | キュウマンキュウセンキュウヒャクキュウジュウキュウバン | 99999番, 九万九千九百九十九番 |

⟵ JAPANESE TEXT

FIG.7Bc

| GROUP ID | VOICE RECOGNITION RESULT | |
|---|---|---|
| | KANA | AFTER KANA-KANJI CONVERSION |
| PAP00000 | ヨウシ | 用紙 |
| | カミ | 紙 |
| | シート | |
| | ペーパー | |
| PAP00001 | サイズ | |
| | オオキサ | 大きさ |
| PAP00002 | ケイレツ | 系列 |
| | ケイトウ | 系統 |
| | カテゴリ | |
| | カテゴリー | |
| PAP00003 | イサイズ | 異サイズ |
| PAP00004 | ドウハバ | 同幅 |
| PAP00004 | イハバ | 異幅 |
| PAP00100 | エイサン | A3 |
| | エーサン | A3 |
| PAP00101 | エイヨン | A4 |
| | エーヨン | A4 |
| PAP00102 | エイゴ | A5 |
| | エーゴ | A5 |
| PAP00103 | ビイヨン | B4 |
| | ビーヨン | B4 |

JAPANESE TEXT

| GROUP ID | VOICE RECOGNITION RESULT | |
|---|---|---|
| | KANA | AFTER KANA-KANJI CONVERSION |
| CHR00000 | エー | A, a |
| | エイ | A, a |
| CHR00001 | ビー | B, b |
| CHR00002 | シー | C, c |
| CHR00003 | ディー | D, d |
| | デー | D, d |
| CHR00004 | イー | E, e |
| CHR00005 | エフ | F, f |
| CHR00006 | ジー | G, g |
| CHR00007 | エイチ | H, h |
| | エッチ | H, h |
| CHR00008 | アイ | I, i |
| ⋮ | | |
| CHR00025 | ゼット | Z, z |
| | ゼー | Z, z |

JAPANESE TEXT

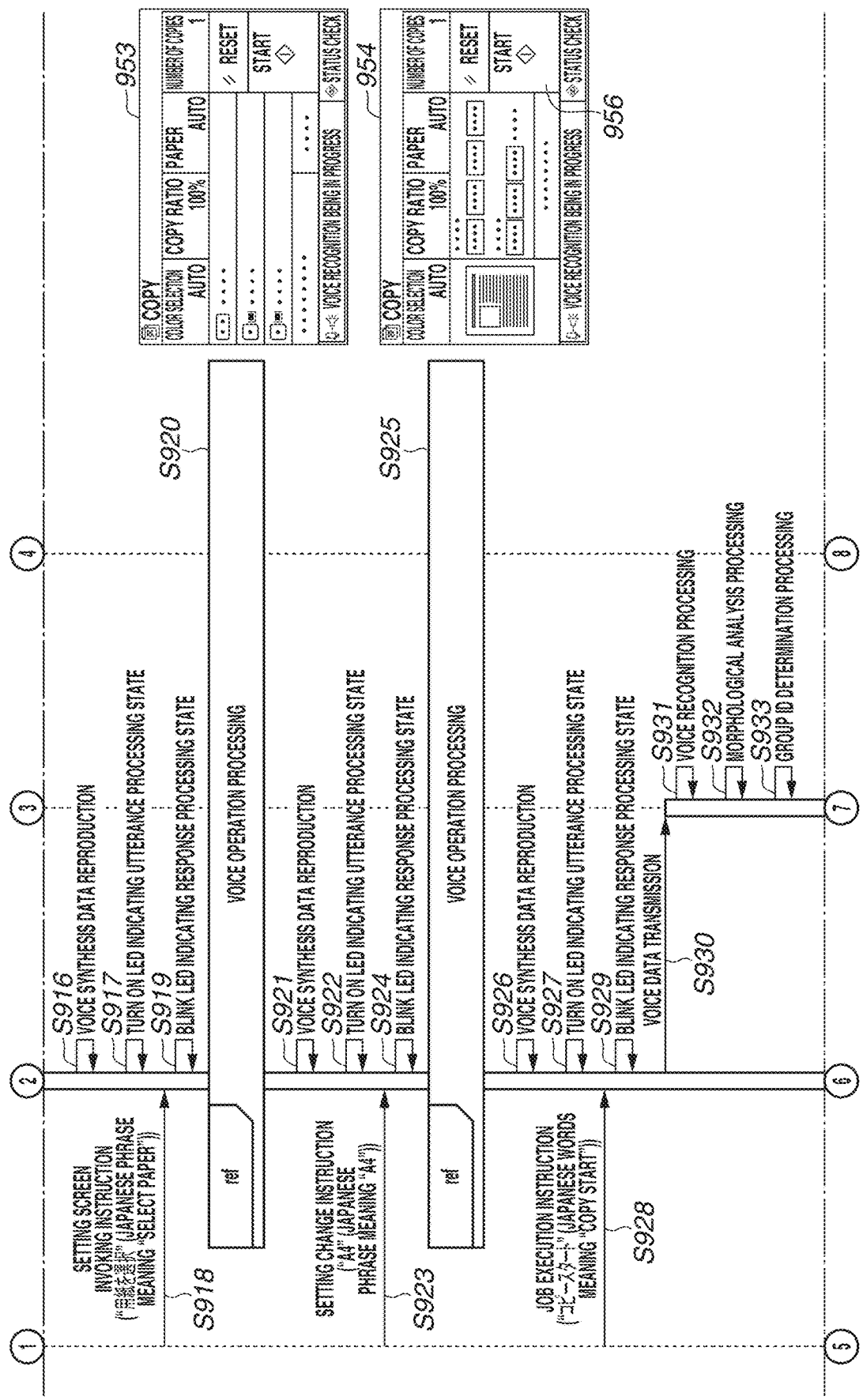

INFORMATION PROCESSING APPARATUS AND STARTUP METHOD FOR INPUT-OUTPUT DEVICE

BACKGROUND

Field

Aspects of the present disclosure generally relate to an information processing apparatus capable of communicating with an input-output device that inputs and outputs voices and to a startup method for the input-output device.

Description of the Related Art

With the development of voice recognition technology, a system that controls an information processing apparatus based on an input voice has been in widespread use. Japanese Patent Application Laid-Open No. 2019-95520 discusses a system that performs print processing in response to a printing instruction generated by the user's voice. This enables the user to issue a setting instruction for a job or an execution instruction for a job only by uttering the instruction content without manipulating an operation unit of the printing apparatus. The input-output device records a voice with a microphone and transmits voice data about the recorded voice to an external server group (a cloud server), and then causes the cloud server to analyze the voice data and controls an image forming apparatus based on an analysis result.

However, the input-output device does not start unless the user utters a voice for starting the input-output device (hereinafter referred to as a "waking word") to the input-output device or unless the user presses a startup button of the input-output device. Moreover, a voice operation service of the information processing apparatus provided by the cloud server does not start unless the user utters a word for starting the voice operation service of the information processing apparatus (hereinafter referred to as a "voice operation startup word") to the input-output device. Therefore, unless the user utters the waking word and the voice operation startup word, the voice operation service of the information processing apparatus, which operates in response to the user's utterance, cannot start up.

SUMMARY

Aspects of the present disclosure are generally directed to providing an information processing apparatus, which is able to start an input-output device without the user uttering a waking word onto the input-output device.

According to an aspect of the present disclosure, an information processing apparatus communicating with an input-output device that receives an input voice, outputs voice data corresponding to the input voice, and is communicates with a server that analyzes the output voice data. The information processing apparatus further includes a voice output unit configured to output a voice, a reception unit configured to receive a user operation for starting up the input-output device, and a control unit configured to perform control to, in response to the user operation received by the reception unit, cause the voice output unit to output a waking word for starting up the input-output device.

Further features will become apparent from the following description of exemplary embodiments with reference to the attached drawings.

BRIEF DESCRIPTION OF THE DRAWINGS

FIGS. 7Ba, 7Bb, and 7Bc are diagrams illustrating words, about which the cloud server performs voice recognition, and a list of group identifications (IDs).

DESCRIPTION OF THE EMBODIMENTS

Various exemplary embodiments, features, and aspects of the disclosure will be described in detail below with reference to the drawings. However, constituent elements set forth in the exemplary embodiments are merely illustrated by an example, and are not intended to limit the scope.

<Configuration of Voice Recognition System>

Figure 1:
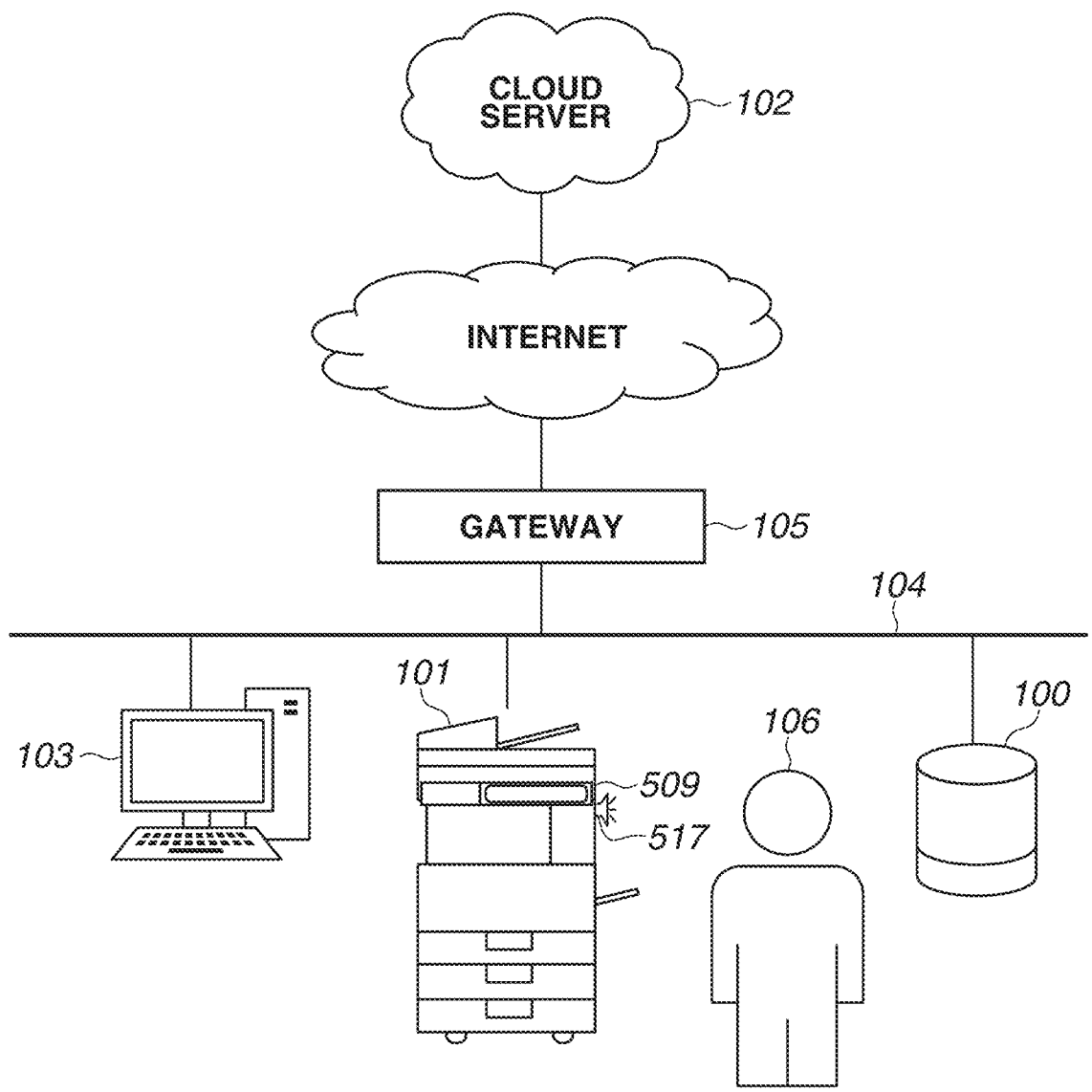
FIG. 1 is a system configuration diagram of a voice recognition system according to a first exemplary embodiment.

FIG. 1 is a diagram illustrating an example of a system configuration of a voice recognition system according to a first exemplary embodiment. As illustrated in FIG. 1, the voice recognition system according to the first exemplary embodiment includes, for example, a voice control device 100, an image forming apparatus 101, a cloud server 102, a client terminal 103, and a gateway 105. The voice control device 100 is an example of an input-output device in the first exemplary embodiment. The image forming apparatus 101 is an example of an information processing apparatus in the first exemplary embodiment. The cloud server 102 is an example of a server in the first exemplary embodiment.

The voice control device 100, the image forming apparatus 101, and the client terminal 103 are capable of communicating with each other via the gateway 105 and a network 104. Furthermore, each of the voice control device 100, the image forming apparatus 101, and the client terminal 103 can be a configuration not composed of a single device, apparatus, or terminal but composed of a plurality of devices, apparatuses, or terminals. Moreover, the voice control device 100, the image forming apparatus 101, and the client terminal 103 are capable of communicating with the cloud server 102 via the gateway 105 and the Internet.

In response to a voice operation start instruction issued from the user 106, the voice control device 100 records the voice of the user 106, converts the recorded voice into coded voice data, and then transmits the voice data to the cloud server 102. The voice control device 100 is, for example, a smart speaker or a smartphone and is a device capable of performing communication with the user via voices. The voice control device 100 is capable of inputting a voice and is also capable of outputting a voice. Furthermore, while, in the first exemplary embodiment, the voice control device 100 and the image forming apparatus 101 are respective independent configurations, the first exemplary embodiment is not limited to such configurations. At least one of hardware constituting the voice control device 100 (hardware blocks illustrated in FIG. 3) and a software function thereof (software blocks illustrated in FIG. 6) can be included in the image forming apparatus 101.

The image forming apparatus 101 is a multifunction peripheral having a plurality of functions such as copying, scanning, printing, and facsimile. Furthermore, the image forming apparatus 101 can be an apparatus having a single function, such as a printer or a scanner. An operation panel 509 is described below with reference to FIG. 2 and FIG. 5. Moreover, a loudspeaker 517 is described below with reference to FIG. 5. The image forming apparatus 101 in the first exemplary embodiment is a color laser beam multifunction peripheral.

Figure 5:
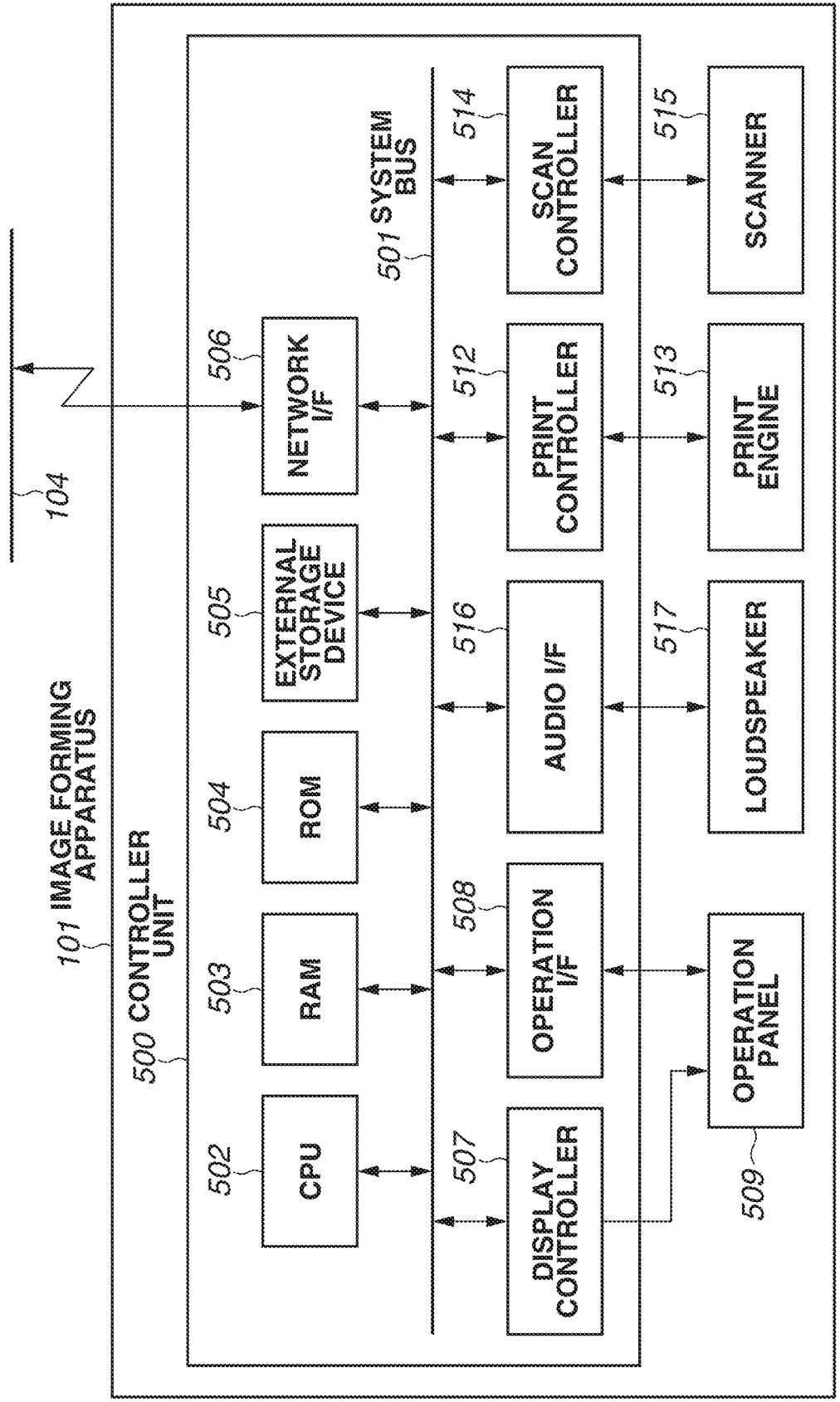
FIG. 5 is a hardware block diagram of an image forming apparatus.

The cloud server 102 is configured with one or more cloud servers and provides voice recognition and a voice operation service of the image forming apparatus 101. The cloud server 102 has roles for voice recognition of voice data about the user 106 acquired by the voice control device 100 and for determining words associated with a screen operation and job execution of the image forming apparatus 101 based on a voice recognition result. Moreover, the cloud server 102 also generates text according to a voice recognition result or a result of determination of words and performs synthesis of voice data used for causing the voice control device 100 to perform voice reproduction of the content of the generated text. Here, the term "job" means a unit of execution of a series of image formation processing operations (for example, copying, scanning, and printing) which the image forming apparatus 101 implements with use of a print engine 513 (FIG. 5) or a scanner 515 (FIG. 5).

The client terminal 103 is, for example, a personal computer (PC) or a smartphone which the user 106 uses. The client terminal 103 generates a print job for causing the image forming apparatus 101 to print an electronic file. The electronic file can be stored in the client terminal 103, or can be stored in, for example, a server somewhere on the Internet or in an external storage device 505 (FIG. 5) of the image forming apparatus 101. Moreover, the client terminal 103 is also able to perform reception of image data obtained by a scanning operation of the image forming apparatus 101. Furthermore, the operation of the client terminal 103 is irrelevant directly to the gist of the first exemplary embodiment, and, therefore, the further detailed description thereof is omitted.

The network 104 interconnects the voice control device 100, the image forming apparatus 101, the client terminal 103, and the gateway 105. The network 104 is used to transmit voice data acquired by the voice control device 100 to the cloud server 102. Moreover, the network 104 is used to transmit voice data transmitted from the cloud server 102. Moreover, the network 104 is used to transmit various pieces of data, such as a print job and a scan job, transmitted from the client terminal 103.

The gateway 105 is, for example, a wireless local area network (LAN) router compliant with the IEEE 802.11 standard series. The gateway 105 can have the ability to operate according to another wireless communication method. Moreover, the gateway 105 can be, instead of a wireless LAN router, for example, a wired LAN router compliant with the Ethernet standard typified by, for example, 10BASE-T, 100BASE-T, and 1000BASE-T, or can have the ability to operate according to another wired communication method. Furthermore, the above-mentioned IEEE 802.11 standard series is a series of standards belonging to IEEE 802.11, such as IEEE 802.11a and IEEE 802.11b.

<Operation Panel of Image Forming Apparatus>

Figure 2:
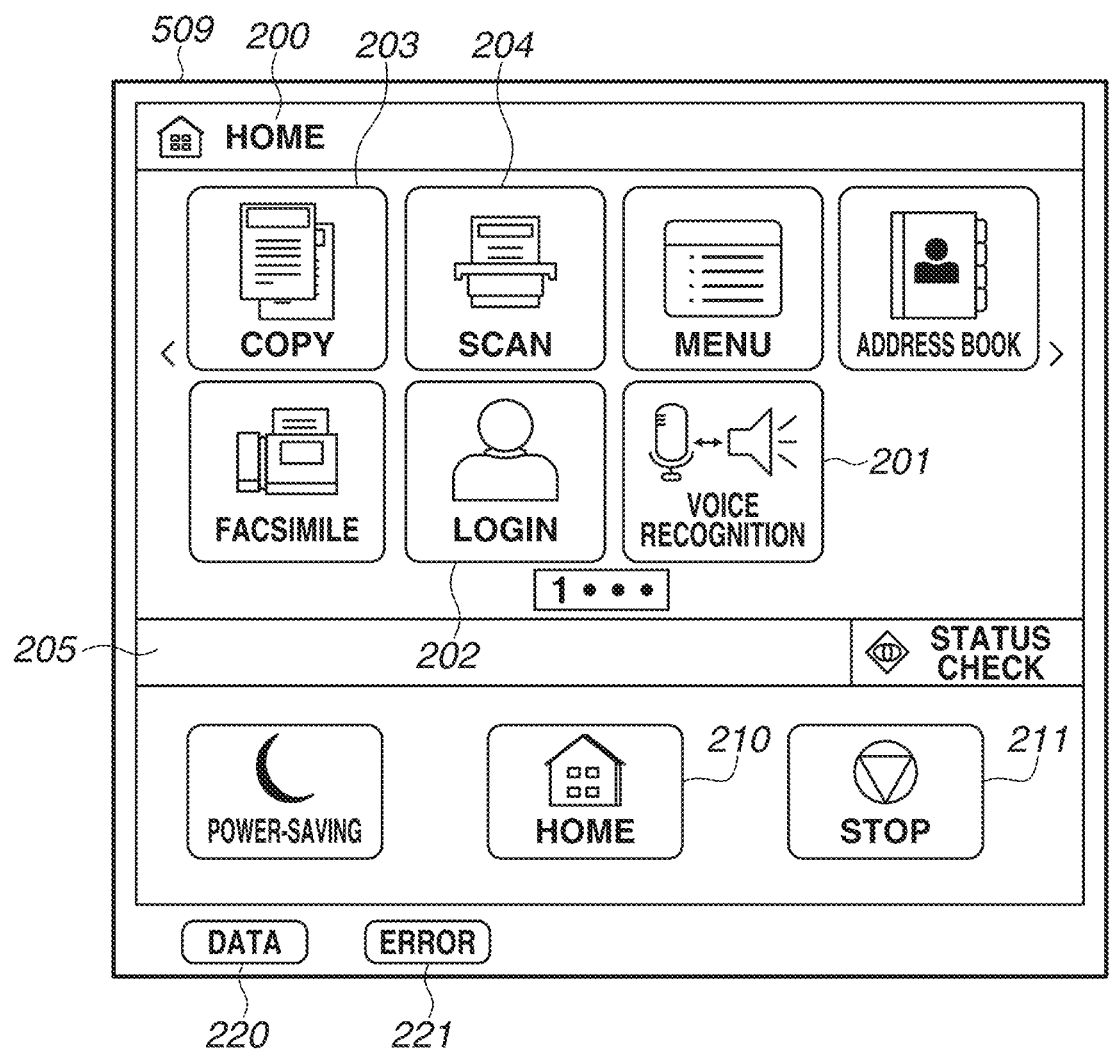
FIG. 2 is a configuration diagram of an operation panel of an information processing apparatus.

FIG. 2 is a diagram illustrating a configuration example of the operation panel 509 of the image forming apparatus 101.

The operation panel 509 includes a light-emitting diode (LED) and a liquid crystal display (LCD). The LED shows the internal state of the image forming apparatus 101, and the LCD displays various pieces of information. Moreover, the operation panel 509 further includes an input unit that receives an operation performed by the user 106. The input unit is, for example, a touch panel 200 integrated with a plurality of hardware keys and a plurality of LCDs. The touch panel 200 illustrated in FIG. 2 displays a home screen, which is displayed immediately after the image forming apparatus 101 is started up. The home screen shows buttons for respective functions which the image forming apparatus 101 executes (for example, a copy button 203, a scan button 204, a facsimile button, a voice recognition button 201, and a login button 202). Here, each button represents a region having a given section on the touch panel 200, which is distinguishable by the user 106, and detecting a touch on the region causes to execute a function as defined on the displayed button.

The voice recognition button 201 is a button used to receive a user operation for starting up the voice control device 100. When voice input using the voice control device 100 is enabled by the voice recognition button 201 being pressed, information indicating voice recognition being in progress is displayed in a region for status displaying 205. The voice recognition button 201 is an example of a reception unit in the first exemplary embodiment.

The login button 202 is used to display a screen for performing user authentication required for using the image forming apparatus 101. After execution of user authentication, a screen customized for each authenticated user is displayed. Moreover, whether to perform voice recognition or not can be set for each authenticated user and whether to enable or disable reception of an input operation using voice recognition for each authenticated user can be set.

A home button 210 is a button used to display the home screen on the touch panel 200. The home button 210 is displayed at all times on the touch panel 200.

A stop button 211 is a button used to stop the operation of the image forming apparatus 101. The stop button 211 is displayed at all times on the touch panel 200.

A data LED 220 and an error LED 221 are used to notify the user of the state of the image forming apparatus 101. The data LED 220 turns on during the progress of a transmission job or a print job, and the error LED 221 turns on when an error (for example, a paper jam or running out of paper) has occurred in the image forming apparatus 101.

The status displaying 205, which is a status displaying region, displays the status of the image forming apparatus 101. The status displaying 205 displays a state of connection with an external voice control device, such as "startup being in progress" or "voice recognition being in progress" which indicates that voice recognition is in the process of starting up. Besides these, the status displaying 205 also displays statuses of a job, such as "printing being in progress", "reception being in progress", "transmission being in progress", and "reading being in progress". Moreover, the status displaying 205 also displays error states, such as "out of paper", "paper jam", and "out of toner". Moreover, in a case where a plurality of statues or states occurs, the status displaying 205 performs displaying while repeatedly switching displaying in every one second. For example, in a case where printing for a copy job is performed in the process of voice recognition, and an out-of-paper error is occurring, the status displaying 205 repeatedly performs displaying while switching between "voice recognition being in progress", "printing being in progress", and "out of paper". Furthermore, during the voice recognition process a notification indicating the displayed status can be issued with a voice by the voice control device 100. For example, a setting in which a notification indicating a voice recognition result is issued with a voice is provided. At the time of setting for issuing a notification with a voice, the voice control device 100 instructs the cloud server 102 to perform control for checking the content of status displaying, acquires voice synthesis data from the cloud server 102, and issues a notification indicating the voice synthesis data. Additionally, during the process of voice recognition, words recognized by voice recognition can be displayed in text on the status displaying 205. For example, the cloud server 102 transmits text data about a voice recognition result to the image forming apparatus 101, and the image forming apparatus 101 displays the received text data on the status displaying 205.

<Hardware Configuration of Voice Control Device>

Figure 3:
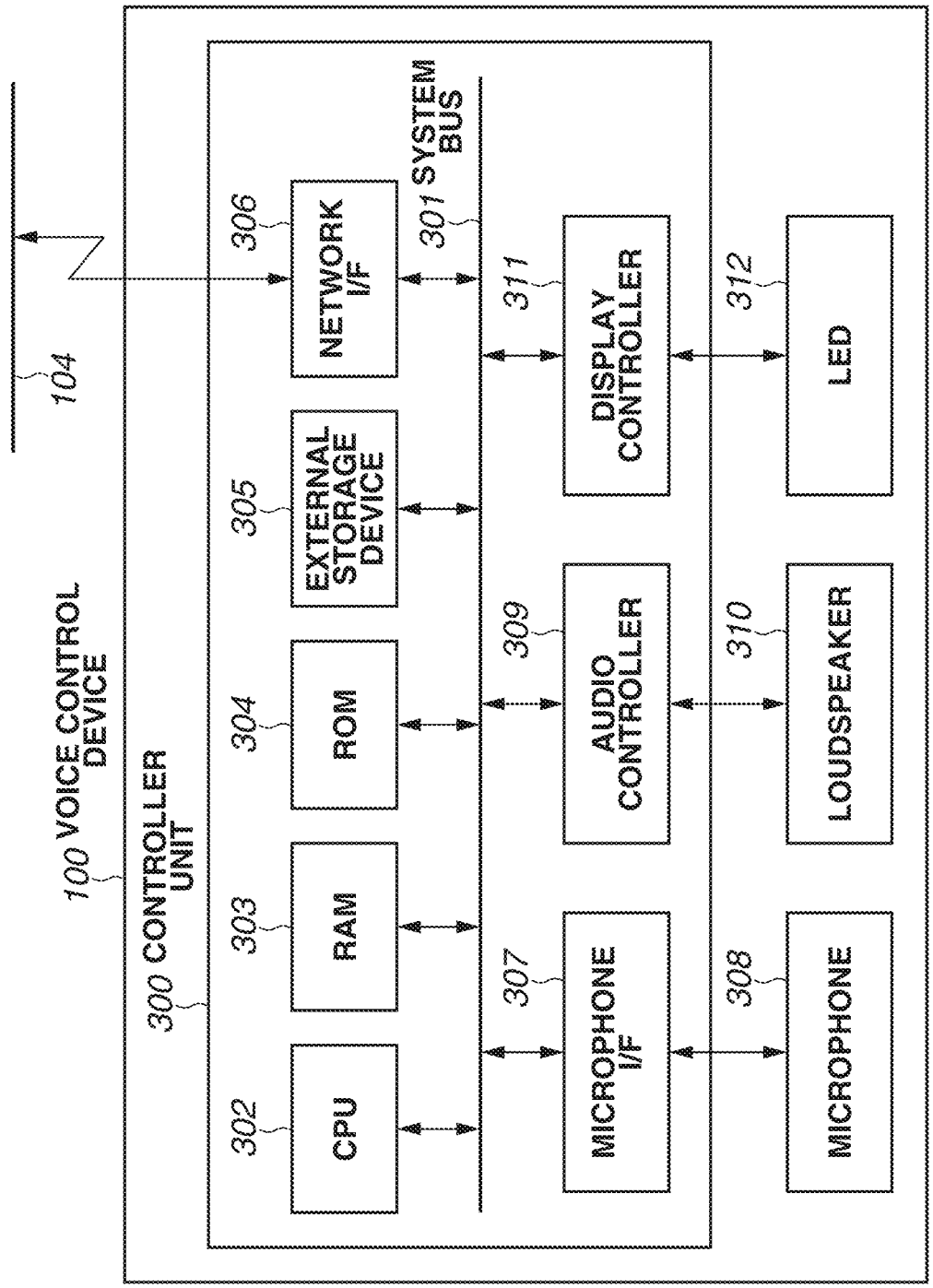
FIG. 3 is a hardware block diagram of a voice control device.

FIG. 3 is a hardware configuration diagram of the voice control device 100.

As illustrated in FIG. 3, a controller unit 300 of the voice control device 100 includes a central processing unit (CPU) 302, a random access memory (RAM) 303, a read-only memory (ROM) 304, an external storage device 305, a network interface (I/F) 306, a microphone I/F 307, an audio controller 309, and a display controller 311. These constituent elements are connected to a system bus 301 and are able to communicate with each other. Moreover, the voice control device 100 further includes, as devices connected to the controller unit 300, a microphone 308, a loudspeaker 310, and an LED 312.

The CPU 302 is a central processing unit that controls the operation of the entire controller unit 300. The RAM 303 is a volatile memory. The ROM 304 is a non-volatile memory and stores therein a startup program for the CPU 302. The external storage device 305 is a storage device having a large capacity (for example, a Secure Digital (SD) card) as compared with the RAM 303. The external storage device 305 stores therein a control program for the voice control device 100, which is executed by the controller unit 300. Furthermore, the external storage device 305 can be replaced by, for example, a flash ROM other than an SD card or can be replaced by another type of storage device having a function equivalent to that of the SD card.

When starting up in response to powering on, the CPU 302 executes the startup program stored in the ROM 304. The startup program is a program for reading out the control program stored in the external storage device 305 and loading the control program onto the RAM 303. After executing the startup program, the CPU 302 then executes the control program loaded onto the RAM 303, and thus performs input and output control for a voice, display control, and data communication control with the network 104. Moreover, the CPU 302 also stores data for use in execution of the control program on the RAM 303 and then performs reading and writing of the data. The external storage device 305 allows various settings required for execution of the control program to be stored therein. The various settings to be stored include, for example, the Uniform Resource Locator (URL) of the cloud server 102 (which enables accessing an image forming apparatus) and waking words, which are read and written by the CPU 302. The CPU 302 performs communications with other devices and apparatuses on the network 104 via the network I/F 306.

The network I/F 306 includes circuits and an antenna which are used to perform communication according to a wireless communication method compliant with the IEEE 802.11 standard series. However, instead of a wireless communication method, a wired communication method compliant with the Ethernet standard can be employed, so that the first exemplary embodiment is not limited to a wireless communication method.

The microphone I/F 307, which is connected to the microphone 308, inputs a voice uttered by the user 106 from the microphone 308, converts the input voice into coded voice data, and stores the coded voice data in the RAM 303 in response to an instruction from the CPU 302.

The microphone 308 is a device for voice input, which is able to acquire the voice of the user 106. For example, the microphone 308 is a small-sized microelectromechanical system (MEMS) microphone mounted in, for example, a smartphone. Moreover, the microphone 308 can include three or more microphones located at predetermined positions in such a way as to be able to calculate the arrival direction of a voice uttered by the user 106. However, even the microphone 308 including only one microphone also enables implementing the first exemplary embodiment, and the first exemplary embodiment is not fixated on the microphone 308 including three or more microphones.

The audio controller 309, which is connected to the loudspeaker 310, converts voice data into an analog voice signal in response to an instruction from the CPU 302 and then outputs a voice via the loudspeaker 310.

The loudspeaker 310 outputs a response sound which indicates that the voice control device 100 is operating in response and a voice synthesis which has been synthesized by the cloud server 102. The loudspeaker 310 is a general-purpose device for outputting a voice, and, since the structure thereof is not the gist of the first exemplary embodiment, a further description thereof is omitted.

The display controller 311, which is connected to the LED 312, controls displaying of the LED 312 according to an instruction from the CPU 302. Here, the display controller 311 mainly performs control of turning-on of an LED for indicating that the voice control device 100 is correctly inputting the voice of the user 106.

The LED 312 is, for example, an LED of, for example, blue color, which is viewable by the user 106. The LED 312 is a general-purpose device, and, since the structure thereof is not the gist of the first exemplary embodiment, a further description thereof is omitted. Furthermore, the LED 312 can be replaced by a display device capable of displaying characters or pictures.

<Hardware Configuration of Cloud Server>

Figure 4:
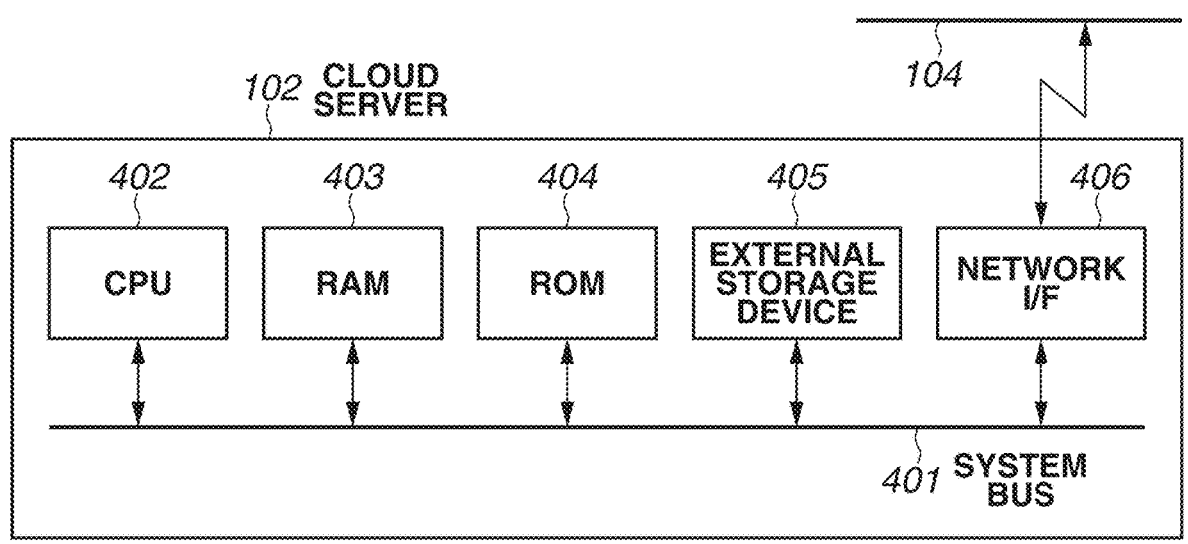
FIG. 4 is a hardware block diagram of a cloud server.

FIG. 4 is a hardware configuration diagram of the cloud server 102.

The cloud server 102 includes a CPU 402, a RAM 403, a ROM 404, an external storage device 405, and a network I/F 406, which are connected to a system bus 401.

The CPU 402 is a central processing unit which controls the operation of the entire cloud server 102. The RAM 403 is a volatile memory. The ROM 404 is a non-volatile memory and stores therein a startup program for the CPU 402. The external storage device 405 is a storage device having a large capacity (for example, a hard disk drive (HDD)) as compared with the RAM 403. The external storage device 405 stores therein a control program for the cloud server 102, which is to be executed by the CPU 402. Furthermore, the external storage device 405 can be replaced by another type of storage device having a function equivalent to that of the hard disk drive, and, for example, a solid state drive (SSD) can be employed instead. Additionally, an external storage which is able to be accessed as the cloud server 102 can be employed instead.

When starting up in response to powering on, the CPU 402 executes the startup program stored in the ROM 404. The startup program is a program for reading out the control program stored in the external storage device 405 and loading the control program onto the RAM 403. After executing the startup program, the CPU 402 then executes the control program loaded onto the RAM 403. Moreover, the CPU 402 also stores data for use in execution of the control program on the RAM 403 and then performs reading and writing of the data. The external storage device 405 allows various settings required for execution of the control program to be stored therein. The various settings are read and written by the CPU 402. The CPU 402 performs communications with other devices and apparatuses on the network 104 via the network I/F 406.

<Hardware Configuration of Image Forming Apparatus>

FIG. 5 is a hardware configuration diagram of the image forming apparatus 101.

As illustrated in FIG. 5, a controller unit 500 includes a CPU 502, a RAM 503, a ROM 504, and an external storage device 505, each of which is connected to a system bus 501. Moreover, the controller unit 500 further includes a network I/F 506, a display controller 507, an operation I/F 508, a print controller 512, a scan controller 514, and an audio I/F 516. These constituent elements are connected to the system bus 501 and are able to communicate with each other.

The CPU 502 is a central processing unit that controls the operation of the entire controller unit 500. The RAM 503 is a volatile memory. The ROM 504 is a non-volatile memory and stores therein a startup program for the CPU 502. The external storage device 505 is a storage device having a large capacity (for example, a hard disk drive (HDD)) as compared with the RAM 503. The external storage device 505 stores therein a control program to be executed by the CPU 502. Furthermore, the external storage device 505 can be replaced by another type of storage device having a function equivalent to that of the hard disk drive, such as a solid-state drive (SSD). The CPU 502 is an example of a control unit in the first exemplary embodiment.

When starting up in response to powering on, the CPU 502 executes the startup program stored in the ROM 504. The startup program is a program for reading out the control program stored in the external storage device 505 and loading the control program onto the RAM 503. After executing the startup program, the CPU 502 then executes the control program loaded onto the RAM 503. Moreover, the CPU 502 also stores data for use in execution of the control program on the RAM 503 and then performs reading and writing of the data. The external storage device 505 allows various settings required for execution of the control program and image data obtained by reading of the scanner 515 to be stored therein, and the various settings and image data are read and written by the CPU 502. The CPU 502 performs communications with other devices and apparatuses on the network 104 via the network I/F 506 and with the cloud server 102 on the Internet via the gateway 105. The network I/F 506 is an example of a communication unit in the first exemplary embodiment.

In response to an instruction from the CPU 502, the display controller 507 performs screen display control of the touch panel 200 of the operation panel 509, which is connected to the display controller 507.

The operation I/F 508 performs inputting and outputting of an operation signal. The operation I/F 508 is connected to the operation panel 509, and, when a portion of the touch panel 200 is pressed, the CPU 502 acquires, via the operation I/F 508, coordinates of the pressed portion of the touch panel 200. The operation I/F 508 is an example of a processing unit or a display control unit in the first exemplary embodiment.

In response to an instruction from the CPU 502, the print controller 512 transmits a control command and image data to the print engine 513, which is connected to the print controller 512. The print controller 512 is an example of a processing unit or a printing control unit in the first exemplary embodiment.

The print engine 513 prints the received image data on a recording medium such as paper according to the control command received from the print controller 512. The detailed description of the print engine 513 is not the gist of the first exemplary embodiment, and, therefore, a further description thereof is omitted.

In response to an instruction from the CPU 502, the scan controller 514 transmits a control command to the scanner 515, which is connected to the scan controller 514, and writes image data received from the scanner 515 in the RAM 503.

The scanner 515 reads, via an optical unit, a document placed on a document positioning glass (mot illustrated) included in the image forming apparatus 101 according to the control command received from the scan controller 514. The detailed description of the scanner 515 is not the gist of the first exemplary embodiment, and, therefore, a further description thereof is omitted.

The audio I/F 516 reads out coded voice data from the RAM 503 in response to an instruction from the CPU 502, converts the decoded digital signal into an analog signal, and outputs the analog signal to the loudspeaker 517.

The loudspeaker 517 outputs a voice in response to an instruction from the CPU 502. The loudspeaker 517 outputs, in addition to a voice, various sounds. For example, an error sound to be sounded when an error has occurred in the image forming apparatus 101, and a touch sound to be sounded when a portion of the touch panel 200 is touched. The loudspeaker 517 is an example of a voice output unit in the first exemplary embodiment.

<Functional Configuration of Voice Control Program for Voice Control Device>

Figure 6:
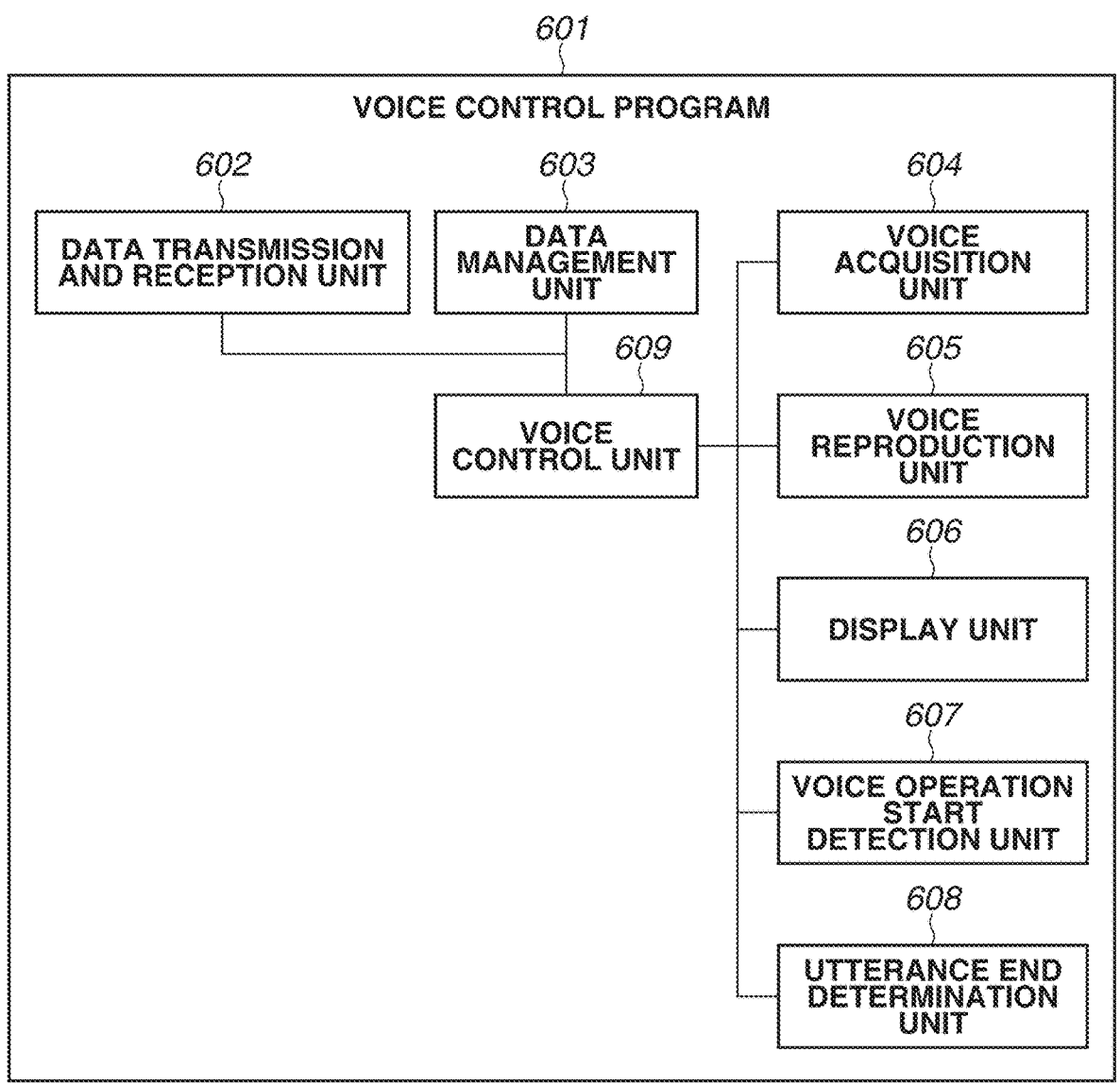
FIG. 6 is a software block diagram of a control program for the voice control device.

FIG. 6 is a block diagram illustrating a functional configuration of a voice control program 601 which the CPU 302 executes.

The voice control program 601 is stored in the external storage device 305. When the voice control device 100 is started up, the voice control program 601 is loaded onto the RAM 303 and then executed by the CPU 302.

A data transmission and reception unit 602 performs transmission and reception of data using Transmission Control Protocol/Internet Protocol (TCP/IP) with other apparatuses and devices on the network 104 via the network I/F 306. The data transmission and reception unit 602 transmits, to the cloud server 102, voice data uttered by the user 106 acquired by a voice acquisition unit 604 described below. Moreover, the data transmission and reception unit 602 receives voice synthesis data that is generated on the cloud server 102.

A data management unit 603 stores various pieces of data, such as working data generated by execution of the voice control program 601, in a predetermined region on the external storage device 305 and manages such stored pieces of data. For example, the data management unit 603 stores, for example, sound volume data which is reproduced by a voice reproduction unit 605 described below, authentication information required for communication with the gateway 105, respective pieces of device information required to perform communication with the image forming apparatus 101 and the cloud server 102, and the URL of a cloud service.

The voice acquisition unit 604 converts an analog voice of the user 106 acquired by the microphone 308 into voice data and then temporarily stores the voice data. The voice of the user 106 is converted into, for example, a predetermined format such as MPEG-1 Audio Layer 3 (MP3) and is then temporarily stored on the RAM 303 as coded voice data to be transmitted to the cloud server 102. The timings of starting and ending of processing performed by the voice acquisition unit 604 are managed by a voice control unit 609 described below. Moreover, coding of voice data can be performed according to a general-purpose format for streaming, or pieces of coded voice data can be sequentially transmitted by the data transmission and reception unit 602.

The voice reproduction unit 605 reproduces voice synthesis data received by the data transmission and reception unit 602 with the loudspeaker 310 via the audio controller 309. The timing of voice reproduction of the voice reproduction unit 605 is managed by the voice control unit 609 described below.

A display unit 606 performs displaying of the LED 312 via the display controller 311. For example, in a case where a voice operation start detection unit 607 described below has detected a voice operation, the display unit 606 displays the LED 312. The timing of displaying of the display unit 606 is managed by the voice control unit 609 described below.

The voice operation start detection unit 607 detects a waking word uttered by the user 106, by pressing of an operation start key (not illustrated) of the voice control device 100. Upon reception of a voice control startup command received by the data transmission and reception unit 602 then transmits an operation start notification to the voice control unit 609. Here, the waking word is a voice word previously determined to start a voice operation of the voice control device 100. The voice operation start detection unit 607 detects a waking word at all times from an analog voice of the user 106 acquired by the microphone 308. The user 106 is able to operate the image forming apparatus 101 by speaking a waking word and then speaking what the user 106 wants to do. Voice processing is performed after the voice operation start detection unit 607 detects a waking word is described below.

An utterance end determination unit 608 determines end timing of processing performed in the voice acquisition unit 604. For example, when the voice of the user 106 breaks up for a predetermined time (for example, 3 seconds), the utterance end determination unit 608 determines that the utterance of the user 106 has ended and then transmits an utterance end notification to the voice control unit 609. Furthermore, the determination of utterance end can be performed based on not a time in which there is no utterance (hereinafter referred to as a "blank time") but a predetermined phrase spoken by the user 106. For example, when the user 106 has spoken a predetermined word such as "はい" (a Japanese word meaning, "yes"), "いいえ" (a Japanese word meaning "no"), "OK" (a Japanese word meaning, "OK"), "キャンセル" (a Japanese word meaning, "cancel"), "終了" (a Japanese word meaning, "end"), "スタート" (a Japanese word meaning, "start"), or "開始" (a Japanese word meaning, "begin"), the utterance end determination unit 608 can determine that the utterance has ended without waiting a predetermined time. Moreover, the determination of utterance end can be performed by not the voice control device 100 but the cloud server 102, and the end of utterance can be determined based on the meaning or context of utterance content of the user 106.

The voice control unit 609 performs control in such a manner that the other respective modules included in the voice control program 601 operate in cooperation with each other. Specifically, the voice control unit 609 controls starting and ending of processing performed by the voice acquisition unit 604, the voice reproduction unit 605, and the display unit 606. Moreover, the voice control unit 609 performs control in such a manner that, after voice data is acquired by the voice acquisition unit 604, the data transmission and reception unit 602 transmits the voice data to the cloud server 102. Moreover, the voice control unit 609 performs control in such a manner that, after the data transmission and reception unit 602 receives voice synthesis data from the cloud server 102, the voice reproduction unit 605 reproduces the voice synthesis data.

Here, the timings of starting and ending of processing performed by the voice acquisition unit 604, the voice reproduction unit 605, and the display unit 606 are described.

Upon receiving an operation start notification from the voice operation start detection unit 607, the voice control unit 609 starts processing which is performed by the voice acquisition unit 604. Moreover, upon receiving an utterance end notification from the utterance end determination unit 608, the voice control unit 609 ends processing which is performed by the voice acquisition unit 604. For example, suppose that the user 106 has uttered a waking word and has then said "コピーをしたい" (a Japanese sentence meaning, "I want to perform copying."). At this time, the voice operation start detection unit 607, detects the voice of the waking word and then transmits an operation start notification to the voice control unit 609. Upon receiving the operation start notification, the voice control unit 609 performs control to start processing performed by the voice acquisition unit 604. The voice acquisition unit 604 converts the subsequently spoken analog voice saying "コピーをしたい" (a Japanese sentence meaning, "I want to perform copying") into voice data and then temporarily stores the voice data. Upon determining that, after the utterance saying "コピーをしたい" (a Japanese sentence meaning, "I want to perform copying"), the blank time reaches a predetermined time, the utterance end determination unit 608 transmits an utterance end notification to the voice control unit 609. Upon receiving the utterance end notification, the voice control unit 609 ends processing performed by the voice acquisition unit 604. Furthermore, a state taken from the time when the voice acquisition unit 604 starts processing to the time when the voice acquisition unit 604 ends the processing referred to as an "utterance processing state". The display unit 606 displays the LED 312 in a lighting-up manner indicating that the utterance processing state is in progress.

After determining ending of the utterance of the user 106, the voice control unit 609 controls the data transmission and reception unit 602 to transmit voice data to the cloud server 102, and then waits a response from the cloud server 102. The response from the cloud server 102 includes, for example, a header portion indicating a response from the cloud server 102 and a response message including voice synthesis data. In response to the data transmission and reception unit 602 receiving the response message, the voice control unit 609 controls the voice reproduction unit 605 to reproduce voice synthesis data. The voice synthesis data is, or example, "コピー画面を表示します" (a Japanese sentence meaning, "A copy screen will be displayed."). Furthermore, a state taken from the time of utterance end determination to the time of ending of reproduction of voice synthesis data referred as a "response processing state". The display unit 606 displays the LED 312 in a blinking manner indicating that the response processing state is in progress.

After response processing, as long as an interactive session with the cloud server 102 continues, the user 106 is allowed to subsequently utter what the user 106 wants to do without uttering a waking word. The determination of ending of the interactive session is performed by the cloud server 102, which then transmits an interactive session end notification to the voice control device 100. Furthermore, a state taken from the time of ending of an interactive session to the time of starting of a next interactive session is referred to as a "waiting state". Until the voice control device 100 receives an operation start notification from the voice operation start detection unit 607, the voice control device 100 is assumed to be in the waiting state at all times. The display unit 606 keeps the LED 312 turned off during the waiting state.

<Functional Configuration of Voice Data Conversion Control Program for Cloud Server>

Figure 7A:
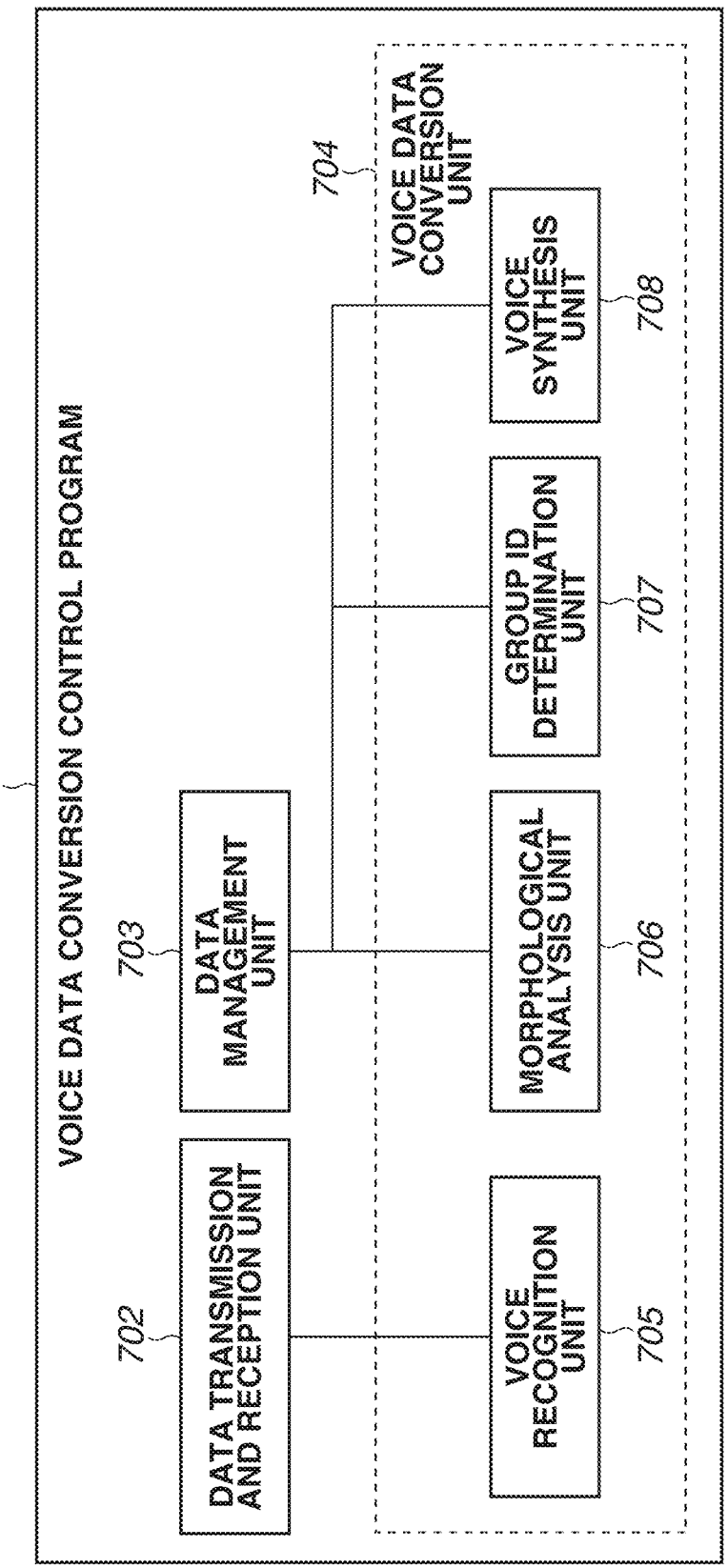
FIG. 7A is a software block diagram of a control program for the cloud server.

FIG. 7A is a block diagram illustrating a functional configuration of a voice data conversion control program 701 which the CPU 402 executes. Moreover, FIGS. 7Ba, 7Bb, and 7Bc illustrates an example of a group identification (ID) list which a group ID determination unit 707 uses for determination of a group ID. In the group ID list, sets of words which have the same meaning or message with respect to user operations of the image forming apparatus 101 are grouped as the same ID. Furthermore, each of the sets of words is a result of voice recognition performed on a phrase that the user 106 utters to the voice control device 100.

The voice data conversion control program 701, stored in the external storage device 405, is loaded onto the RAM 403 and then executed by the CPU 402.

A data transmission and reception unit 702 performs transmission and reception of data using TCP/IP with other apparatuses and devices on the network 104 via the network I/F 406. The data transmission and reception unit 702 receives voice data about the user 106 from the voice control device 100. Moreover, the data transmission and reception unit 702 transmits a group ID determination result obtained by determination performed by the group ID determination unit 707 described below.

A data management unit 703 stores various pieces of data, such as working data generated by execution of the voice data conversion control program 701 and parameters required for performing voice recognition processing in a voice data conversion unit 704, in a predetermined region on the external storage device 405 and manages such stored pieces of data. For example, the data management unit 703 stores acoustic models and language models used for a voice recognition unit 705 to convert voice data into text (text information) in a predetermined region on the external storage device 405 and manages such acoustic models and language models. Moreover, the data management unit 703 stores a dictionary used for a morphological analysis unit 706 to perform morphological analysis of text in a predetermined region on the external storage device 405 and manages such a dictionary. Moreover, the data management unit 703 stores a group ID list used for the group ID determination unit 707 to determine a group ID in a predetermined region on the external storage device 405 and manages such a group ID list. Moreover, the data management unit 703 stores a voice database used for a voice synthesis unit 708 to perform voice synthesis in a predetermined region on the external storage device 405 and manages such a voice database. Moreover, the data management unit 703 stores therein, for example, respective pieces of device information required for performing communications with the voice control device 100 and the image forming apparatus 101 and manages such respective pieces of device information.

The voice data conversion unit 704 includes the voice recognition unit 705, the morphological analysis unit 706, the group ID determination unit 707, and the voice synthesis unit 708. In the following description, the voice data conversion unit 704 is described.

The voice recognition unit 705 performs voice recognition processing for converting the voice data received by the data transmission and reception unit 702 into text. The voice recognition processing converts voice data into phonemes with use of an acoustic model, and further converts the phonemes into actual text data with use of pattern matching using a language model. Furthermore, the acoustic model can be a model using a machine learning method employing a neural network, such as deep neural network-hidden Markov model (DNN-HMM), or can be a model using a different method, such as Gaussian mixture model-hidden Markov model (GMM-HMM). In the machine learning using a neural network, learning of a learning model is performed based on, for example, teacher data (training data) including a voice and text as a pair. The language model can be a model using a mode for a machine learning method employing a neural network, such as recurrent neural network (RNN), or can be a model using a different method, such as an N-gram method.

In the first exemplary embodiment, the above-mentioned text data is assumed to include a text composed of one or more kana (kana being a Japanese syllabic script) and a text obtained by performing "kana-kanji conversion" of such kana (including conversion into, for example, a numeral, alphabet, and symbol). However, another method can be used as voice recognition processing for converting voice data into text data, and the first exemplary embodiment is not limited to the above-mentioned method. The detailed description of voice recognition processing is not the gist of the first exemplary embodiment, and, therefore, a further description thereof is omitted.

The morphological analysis unit 706 performs morphological analysis of text data obtained by conversion performed by the voice recognition unit 705. The morphological analysis derives a morpheme string from a dictionary including information about, for example, grammar of the applicable language and parts of speech, and, additionally, discriminates, for example, a part of speech of each morpheme. The morphological analysis unit 706 can be implemented with use of known morphological analysis software, such as JUMAN, ChaSen, and MeCab.

The morphological analysis unit 706 analyzes, for example, text data indicating "コピーをしたい" (a Japanese sentence meaning "I want to perform copying."), obtained by conversion performed by the voice recognition unit 705, as a morpheme string including "コピー", "を", "し", and "たい". Moreover, the morphological analysis unit 706 analyzes text data indicating "A 3 から A 4へ" (a Japanese phrase meaning "from A3 to A4") as a morpheme string including "A 3", "から", "A 4", and "へ".

The group ID determination unit 707 determines a group ID by performing matching between a result of morphological analysis performed by the morphological analysis unit 706 and the group ID list illustrated in FIGS. 7Ba, 7Bb, and 7Bc, and, additionally, generates a group ID determination result. For example, with respect to a morpheme string including "コピー", "を", "し", and "たい", the group ID determination unit 707 determines that there is "FNC00001", which is a group ID of "コピー", and generates "ID: FNC00001" as a group ID determination result. Moreover, with respect to a morpheme string including "A 3," "から", "A 4", and "へ", the group ID determination unit 707 determines that there are two, "PAP00100" and "PAP00101", which are respective group IDs of "A 3" and "A 4". Then, the group ID determination unit 707 generates {ID: PAP00100, ID: PAP00101} as a group ID determination result.

Furthermore, in a case where a plurality of IDs is generated as a group ID determination result, those IDs are assumed to be generated in the order of being subjected to voice recognition and morphological analysis. For example, in a case where a result obtained by performing voice recognition and morphological analysis is "A 4", "から", "A 3", and "へ", the group ID determination result is generated as {ID: PAP00101, ID: PAP00100}. Moreover, a group ID is assumed to be allowed to be determined by joining a plurality of morphemes adjacent to each other and performing matching between the joined plurality of morphemes and the group ID list. At this time, in a case where one matching morpheme has been found from among the group ID list and a matching plurality of morphemes including the matching morpheme has been found from among the group ID list, the group ID determination unit 707 generates a group ID determination result using the latter result. For example, in a case where the found morpheme string is "A" and "4", the group ID determination unit 707 generates a group ID determination result as not {ID: CHR00000, ID: NUM00004} but {ID: PAP00101}. Moreover, the group ID determination unit 707 can combine a text composed of one or more kana included in a voice recognition and morphological analysis result and a text obtained by performing "kana-kanji conversion" of such kana and then perform matching between the combined text and the group ID list. For example, first, the group ID determination unit 707 performs matching between a text obtained by performing "kana-kanji conversion" and texts shown in the column "after kana-kanji conversion" of the group ID list. As a result, in a case where a group ID in which a matched result is obtained is not found, the group ID determination unit 707 detects a group ID in which a text of kana and a text shown in the column "kana" match each other. Moreover, in a case where "kana" is present in a duplicate manner in the group ID list and there is a plurality of group Ids in which a matched result is obtained, the group ID determination unit 707 can generate a group ID determination result as a plurality of candidates. With this processing, the group ID determination unit 707 generates a group ID determination result in which a mistake of "kana-kanji conversion or a difference in furigana is allowable.

The voice synthesis unit 708 performs voice synthesis processing based on a notification received from the image forming apparatus 101. The voice synthesis processing converts, with respect to a predetermined notification, texts previously prepared as a pair into voice data with a predetermined format such as MP3. An example of a combination of the received notification data and a text targeted for voice synthesis is described below with reference to the sequence diagrams of FIGS. 9Aa, 9Ab, and 9Ac. The voice synthesis processing generates voice data based on, for example, a voice database stored in the data management unit 703. The voice database is a database obtained by collecting voices generated by uttering typical contents such as words. Furthermore, while, in the first exemplary embodiment, voice synthesis processing is performed with use of a voice database, another method can be used as a method for voice synthesis, so that the first exemplary embodiment is not limited to a method using a voice database. The detailed description of the voice synthesis processing is not the gist of the first exemplary embodiment, and, therefore, a further description thereof is omitted.

<Functional Configuration of Device Control Program for Image Forming Apparatus>

Figure 8:
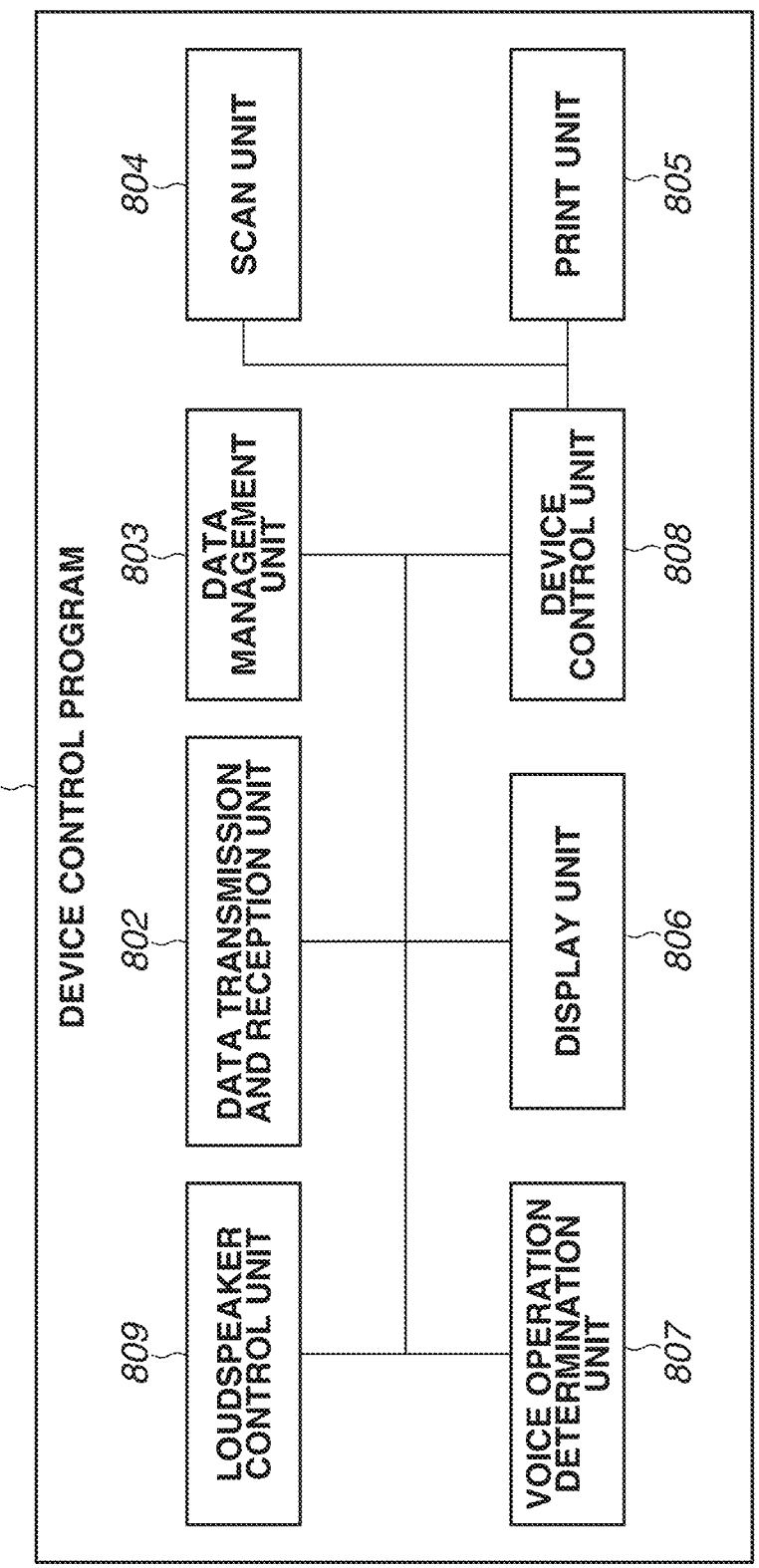
FIG. 8 is a software block diagram of a control program for the image forming apparatus.

FIG. 8 is a block diagram illustrating a functional configuration of a device control program 801 which the CPU 502 executes.

The device control program 801 for the image forming apparatus 101 is stored in the external storage device 505, and is loaded onto the RAM 503 and executed by the CPU 502.

A data transmission and reception unit 802 performs transmission and reception of data using TCP/IP with other apparatuses and devices on the network 104 via the network I/F 506. The data transmission and reception unit 802 receives a group ID determination result generated by the group 1D determination unit 707. Moreover, the data transmission and reception unit 802 transmits, from the image forming apparatus 101 to the cloud server 102, a screen update notification, which indicates that the screen display content of the touch panel 200 of the operation panel 509 has been updated, and a job execution state notification, which indicates the state of a job. The contents of such notifications are described below with reference to the sequence diagrams of FIGS. 9Aa, 9Ab, and 9Ac. Additionally, the data transmission and reception unit 802 also transmits, for example, voice data for starting up voice recognition and voice data for starting a voice operation to the voice control device 100 via the network 104.

A data management unit 803 stores various pieces of data, such as working data generated in execution of the device control program 801 and setting parameters required for respective device control operations, in the RAM 503 and in a predetermined region on the external storage device 505, and manages such various pieces of data. For example, the data management unit 803 stores and manages job data composed of a combination of each setting item and setting value of a job which is executed by a device control unit 808 described below and machine setting information having, for example, attribute information about paper set therein. Moreover, the data management unit 803 stores and manages, for example, authentication information required for communication with the gateway 105 and device information, URL (for example, http://aaaaa/mfp_mng), and authentication information required for communication with the cloud server 102. Moreover, the data management unit 803 stores and manages image data targeted for image formation to be performed by the image forming apparatus 101. Moreover, the data management unit 803 stores screen control information that a display unit 806 uses for screen display control and voice operation determination information that a voice operation determination unit 807 uses to determine an operation, and manages the screen control information and the voice operation determination information for each screen that the display unit 806 displays. Moreover, the data management unit 803 manages, for example, voice data concerning a waking word for the voice control device 100 and a word for voice operation startup (a voice operation startup word), and instructions and control commands for voice recognition startup and voice operation startup caused by a network I/F or another startup unit.

A scan unit 804 causes the scanner 515 to perform scanning via the scan controller 514 based on scan job parameter setting of the device control unit 808 described below, and stores the read image data in the data management unit 803.

A print unit 805 causes the print engine 513 via the print controller 512 to perform printing based on print job parameter setting of the device control unit 808 described below.

The display unit 806 performs control of the operation panel 509 via the display controller 507 and thus displays user-operable user interface (UI) components (for example, buttons, pull-down lists, and checkboxes) on the touch panel 200 based on the above-mentioned screen display control information. Moreover, the display unit 806 acquires coordinates of a touched portion on the touch panel 200 (hereinafter referred to as, for example, a "screen") via the operation I/F 508, and determines a UI component targeted for operation and a processing content received at the time of operation reception. According to determination of the processing content, the display unit 806 updates the display content of the screen and transmits, to the device control unit 808, parameters of a job set by the user operation and a start instruction for the job. Moreover, according to a voice operation determination result of the voice operation determination unit 807, the display unit 806 also updates the display content of the screen and transmits, to the device control unit 808, parameters of a job set by the user operation and a start instruction for the job.

The voice operation determination unit 807 determines a user-operable UI component, which constitutes a screen to be displayed on the operation panel 509, as an operation target based on a group ID received by the data transmission and reception unit 802 from the cloud server 102. For example, in a case where, in a state in which a home screen is displayed on the touch panel 200, the group ID: FNC00001 ("コピー" (a Japanese word meaning "copy")) illustrated in FIGS. 7Ba, 7Bb, and 7Bc has been received, the screen transitions to a copy screen 952 (FIG. 9Aa), and, in a case where, in that state, the group ID: OPR00011 ("スタート" (a Japanese word meaning "start")) has been received, copying is performed. The copy screen 952 is an example of a print setting screen in the first exemplary embodiment and is a screen showing settings of printing. With this setting, the user is allowed to input print setting. At this time, the user 106 presses the voice recognition button and, after displaying of a status indicating voice recognition being in progress, utters "コピーをスタートして" (Japanese sentence meaning "Start copying") to the voice control device 100, so that copying is started in a default setting state of the copy screen.

The device control unit 808 performs control and instruction operations on the print engine 513 and the scanner 515 via the print controller 512 and the scan controller 514, respectively. For example, in a case where, when displaying a copy function screen, the display unit 806 has detected pressing of a start key 956 (FIG. 9Ab) on the touch panel 200, the device control unit 808 receives parameters of a copy job and a job start instruction from the display unit 806. The device control unit 808 performs control based on the job parameters in such a way as to cause the print engine 513 to print image data read by the scanner 515 on a sheet. Furthermore, the mechanisms of scanning and print control are not the gist of the first exemplary embodiment, and, therefore, a further description thereof is omitted.

A loudspeaker control unit 809 copies voice data stored in the external storage device 505 or voice data received from the network 104 to the RAM 503, causes the audio I/F 516 to convert the voice data from a digital signal into an analog signal, and outputs the analog signal to the loudspeaker 517. In the first exemplary embodiment, the loudspeaker control unit 809 outputs a waking word for the voice control device 100 and a voice operation startup word for voice operation startup.

<Control Sequence of Voice Recognition System>

Figure 9A:
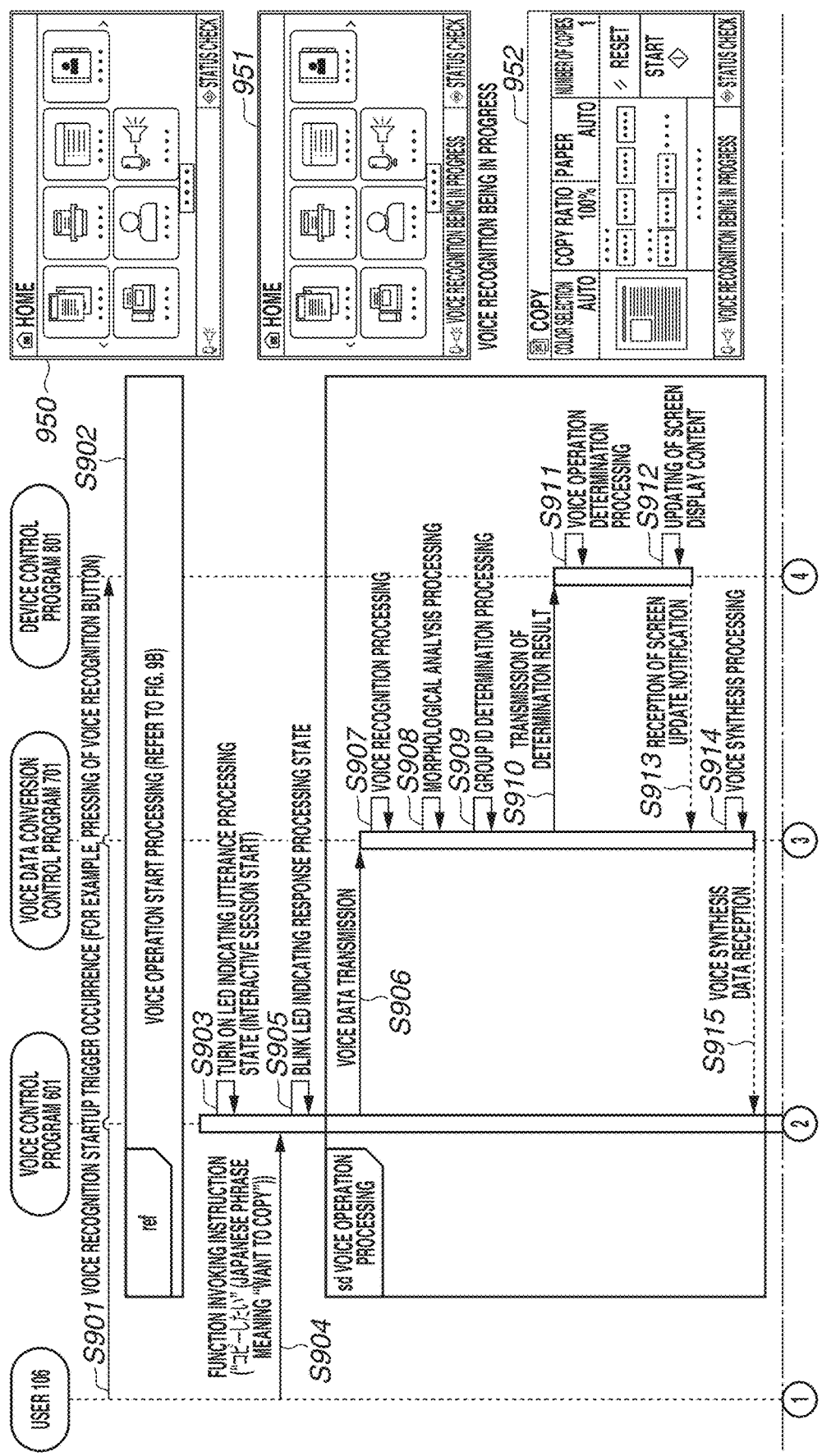
FIGS. 9Aa, 9Ab, and 9Ac are diagrams illustrating a sequence performed between devices that constitute the voice recognition system.
Figure 9A:
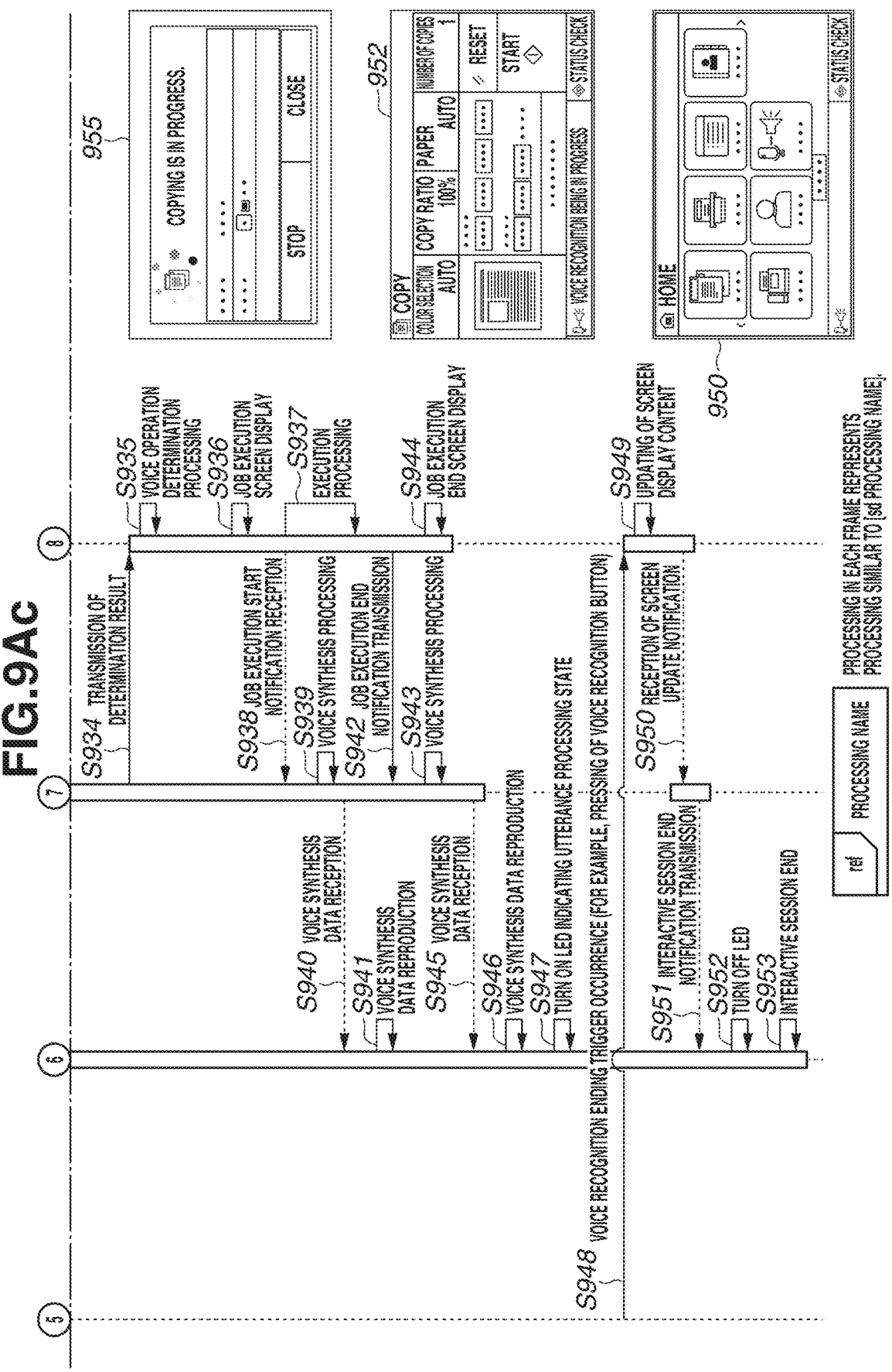

FIGS. 9Aa, 9Ab, and 9Ac are sequence diagrams illustrating interactions between respective devices or apparatuses that constitute the voice recognition system illustrated in FIG. 1. Particularly, FIGS. 9Aa, 9Ab, and 9Ac illustrate a sequence in which the voice control device 100 receives a voice operation uttered by the user 106 and the image forming apparatus 101 performs respective processing operations in response to the voice operation and returns a response indicating a result of the performed processing operations by a voice to the user 106.

Furthermore, in an example of the sequence illustrated in FIGS. 9Aa, 9Ab, and 9Ac, the voice control device 100, the image forming apparatus 101, and the cloud server 102 are assumed to be in a state of being able to communicate with each other. Moreover, the image forming apparatus 101 is assumed to be in a state of being displaying a home screen 950 available for invoking functions such as copying, scanning, and printing after startup of powering on.

First, in step S901, in a state in which the home screen 950 is displayed, the user 106 instructs the image forming apparatus 101 to start a voice operation (hereinafter, this being referred to as a "voice recognition startup trigger").

In step S902, in response to detection of the voice recognition startup trigger, the image forming apparatus 101 performs voice operation start processing. The voice operation start processing is described below at voice operation start processing illustrated in FIG. 9B. In the description of the first exemplary embodiment, after starting of the voice operation start processing, the image forming apparatus 101 is assumed to display a home screen 951 and be in a state of being able to receive a voice operation. The status displaying 205 in the home screen 951 displays a status indicating voice recognition being in progress. The operation panel 509 is an example of a state display unit in the first exemplary embodiment.

In step S903, the display unit 606 of the voice control program 601 turns on an LED indicating utterance processing being in progress, and the voice acquisition unit 604 starts processing.

In step S904, the user 106 issues a copy screen invoking instruction to the voice control device 100. The copy screen invoking instruction is, for example, the user 106 uttering "コピーしたい" (a Japanese phrase meaning, "want to copy") or "コピー画面を開いて" (a Japanese sentence meaning, "Open a copy screen."), and a voice acquired by the voice acquisition unit 604 is generated as voice data. If the blank time elapses for a predetermined time after the utterance of the user 106, the utterance end determination unit 608 determines that the utterance has ended.

In step S905, the display unit 606 of the voice control program 601 blinks an LED indicating a response processing state according to the utterance ending determination. Moreover, at the same time, the voice acquisition unit 604 ends the processing.

In step S906, the data transmission and reception unit 602 transmits the voice data generated in step S904 to the cloud server 102.

In step S907, the voice recognition unit 705 of the voice data conversion control program 701 performs voice recognition processing on the voice data received by the data transmission and reception unit 702. With the voice recognition processing, for example, a voice indicating "コピーしたい" (a Japanese phrase meaning, "want to copy") uttered by the user 106 is generated as text.

In step S908, the morphological analysis unit 706 of the voice data conversion control program 701 performs morphological analysis processing on the text generated in step S907. With the morphological analysis processing, for example, a text indicating "コピーしたい" (a Japanese phrase meaning, "want to copy") is analyzed as a morpheme string including "コピー", "し", and "たい".

In step S909, the group ID determination unit 707 of the voice data conversion control program 701 performs group ID determination processing on the text analyzed as a morpheme string. With the group 1D determination processing, for example, by matching between the morpheme string including "コピー", "し", and "たい" and the group ID list illustrated in FIG. 7Bb, {ID: FNC00001} is generated as a group ID determination result.

In step S910, the data transmission and reception unit 702 of the voice data conversion control program 701 transmits the group ID determination result generated in step S909 to the image forming apparatus 101.

In step S911, the voice operation determination unit 807 of the device control program 801 performs voice operation determination processing on the group ID determination result received by the data transmission and reception unit 802. With the voice operation determination processing, for example, it is determined from the group ID determination result {ID: FNC00001} that the "copy" button 203 in the home screen has been selected.

In step S912, according to a result of determination performed in step S911, the display unit 806 updates contents to be displayed in the screen. For example, through the processing performed up to this point, in a case where it has been determined from "コピーしたい" (a Japanese phrase meaning "want to copy") uttered by the user 106 that there is an operation on the "copy" button 203 displayed in the screen, a copy function screen 952, which is displayed at the time of pressing of the "copy" button 203 on the touch panel 200, is displayed.

In step S913, the data transmission and reception unit 802 transmits, to the cloud server 102, a screen update notification indicating that the display contents of the screen have been updated. For example, in a case where the display unit 806 has changed displaying from the home screen to the copy function screen, the data transmission and reception unit 802 transmits text data indicating "コピー機能画面表示" (Japanese words meaning, "copy function screen display").

In step S914, with respect to the screen update notification received by the data transmission and reception unit 702 of the voice data conversion control program 701, the voice synthesis unit 708 performs voice synthesis processing of predetermined text data corresponding to the contents of the screen update notification. For example, in a case where the contents of the screen update notification are "コピー機能画面表示" (Japanese words meaning, "copy function screen display"), the voice synthesis unit 708 performs voice synthesis of text data indicating "コピー画面を表示しました" (a Japanese sentence meaning, "A copy screen has been displayed."). Voice data (voice synthesis data) generated by voice synthesis processing performed by the voice synthesis unit 708 is transmitted to the voice control device 100 by the data transmission and reception unit 702.

In step S915, the data transmission and reception unit 602 receives the voice synthesis data generated in step S914.

In step S916, the voice reproduction unit 605 reproduces the voice synthesis data received in step S915. For example, the voice reproduction unit 605 reproduces, via the loudspeaker 310, voice synthesis data indicating a "コピー画面を表示しました" (a Japanese sentence meaning. "A copy screen has been displayed.") generated in step S914.

Step S917 is similar to the above-mentioned step S903.

In step S918, the user 106 issues a setting screen invoking instruction to the voice control device 100. The setting screen invoking instruction is, for example, the user 106 uttering "用紙を選択" (a Japanese phrase meaning, "select paper"), and a voice acquired by the voice acquisition unit 604 is generated as voice data. If the blank time elapses for a predetermined time after the utterance of the user 106, the utterance end determination unit 608 determines that the utterance has ended.

Step S919 is similar to the above-mentioned step S905.

Step S920 represents voice operation processing similar to the processing in the above-mentioned steps S906 to S915. However, in step S920, in association with the setting screen invoking instruction issued in step S918, the display unit 806 updates the screen in such a way as to display the setting screen. For example, in the process of displaying the copy function screen, when the group ID determination result is {ID: PAP00000, ID: OPR00040}, the display unit 806 displays a paper selection screen 953.

In step S921, the voice reproduction unit 605 reproduces voice synthesis data received in step S920. For example, the voice reproduction unit 605 reproduces voice synthesis data indicating "用紙を選択。続いて用紙を設定してください。" (Japanese sentences meaning, "A paper selection screen has been displayed. Then, perform setting of paper.") generated in step S920 via the loudspeaker 310.

Step S922 is similar to the above-mentioned step S903.

In step S923, the user 106 issues a setting change instruction to the voice control device 100. The setting change instruction is, for example, the user 106 uttering "A 4" (a Japanese phrase meaning, "A4"). If the blank time elapses for a predetermined time after the utterance of the user 106, the utterance end determination unit 608 determines that the utterance has ended.

Step S924 is similar to the above-mentioned step S905.

Step S925 represents voice operation processing similar to the processing in the above-mentioned steps S906 to S915. However, in step S925, in association with the setting change instruction issued in step S923, the display unit 806 changes a setting value to be displayed in the setting screen. For example, in the process of displaying the paper selection screen, when the group ID determination result is {ID: PAP00101}, the display unit 806 displays a paper selection screen 954, in which the setting value of paper has been changed to A4.

In step S926, the voice reproduction unit 605 reproduces voice synthesis data generated by the voice synthesis processing performed in step S925. For example, in a case where, in step S925, the setting value of paper has been changed and the changed setting value has been displayed, the voice reproduction unit 605 reproduces voice synthesis data indicating "用紙をA4に設定しました" (a Japanese sentence meaning, "Paper has been set to A4.") via the loudspeaker 310.

Step S927 is similar to the above-mentioned step S903.

In step S928, the user 106 issues a job execution instruction to the voice control device 100. The job execution instruction is, for example, the user 106 uttering "コピースタート" (Japanese words meaning, "copy start"). If the blank time elapses for a predetermined time after the utterance of the user 106, the utterance end determination unit 608 determines that the utterance has ended.

Processing in steps S929 to S934 is similar to the above-mentioned processing in steps S905 to S910.

In step S935, the voice operation determination unit 807 of the device control program 801 performs voice operation determination processing on the group ID determination result received by the data transmission and reception unit 802. In a case where the group ID determination result is {D: FNC00001, ID: OPR00011}, it is determined that a "start" button 956 displayed in the screen has been operated.

In step S936, the display unit 806 displays a job execution screen 955 according to a result of determination performed in step S935. For example, through the processing performed up to this point, in a case where it has been determined that the voice of "コピースタート" (Japanese words meaning, "copy start") uttered by the user 106 is an operation performed on the start button 956, a screen for copy job start is displayed.

In step S937, the device control program 801 executes a copy job according to the job parameters set in the screen of the image forming apparatus 101.

In step S938, the data transmission and reception unit 802 transmits, to the cloud server 102, information indicating that execution of the job has been started (a job execution start notification) as the contents of the job execution state notification. For example, in a case where a copy job has been started, the data transmission and reception unit 802 transmits text data indicating "コピージョブ開始" (Japanese words meaning, "copy job start") as the contents of the job execution state notification.

In step S939, the data transmission and reception unit 702 of the voice data conversion control program 701 receives the job execution state notification, and the voice synthesis unit 708 performs voice synthesis processing of predetermined text data corresponding to the contents thereof (the job execution start notification). For example, in a case where the contents of the job execution state notification are "コピージョブ開始" (Japanese words meaning, "copy job start"), the voice synthesis unit 708 performs voice synthesis of text data indicating "コピーを開始します" (a Japanese sentence meaning, "Copying is started.").

Step S940 is similar to the above-mentioned step S915.

In step S941, the voice reproduction unit 605 reproduces the voice synthesis data received in step S940. For example, the voice reproduction unit 605 reproduces voice synthesis data indicating "コピーを開始します" (a Japanese sentence meaning, "Copying is started.") generated in step S939 via the loudspeaker 310.

In step S942, the data transmission and reception unit 802 transmits, to the cloud server 102, information indicating that execution of the job has been ended (a job execution end notification) as the contents of the job execution state notification. For example, in a case where a copy job has been ended, the data transmission and reception unit 802 transmits text data indicating "コピージョブ終了" (Japanese words meaning, "copy job end") as the contents of the job execution state notification.

In step S943, the data transmission and reception unit 702 of the voice data conversion control program 701 receives the job execution state notification, and the voice synthesis unit 708 performs voice synthesis processing of predetermined text data corresponding to the contents thereof (the job execution end notification). For example, in a case where the contents of the job execution state notification are "コピージョブ終了" (Japanese words meaning, "copy job end"), the voice synthesis unit 708 performs voice synthesis of text data indicating "コピーを終了しました" (a Japanese sentence meaning, "Copying has been ended.").

In step S944, in response to ending of the job execution processing performed in step S937, the display unit 806 displays a job execution end screen. For example, in a case where execution of a copy job has ended, the display unit 806 closes the job execution screen 955 and displays the copy function screen 952.

In step S945, the data transmission and reception unit 602 receives, from the cloud server 102, the voice synthesis data generated in step S943.

In step S946, the voice reproduction unit 605 reproduces the voice synthesis data received in step S945. For example, the voice reproduction unit 605 reproduces voice synthesis data indicating "コピーを終了しました" (a Japanese sentence meaning, "Copying has been ended.") generated in step S943 via the loudspeaker 310.

Step S947 is similar to the above-mentioned step S903.

In step S948, the user 106 presses the voice recognition button 201 to instruct the image forming apparatus 101 to end the voice operation. The voice operation, which has started up in response to pressing of the voice recognition button 201 in step S901, ends in response to the occurrence of an ending trigger in which the user 106 presses the voice recognition button 201 again.

In step S949, the voice operation determination unit 807 determines the occurrence of an ending trigger for voice recognition, and the display unit 806 deletes displaying of "voice recognition being in progress" in the status displaying 205 and displays the home screen 950.

In step S950, the data transmission and reception unit 802 transmits, to the cloud server 102, a screen update notification indicating that the display contents of the screen have been updated. For example, the data transmission and reception unit 802 transmits text data indicating "音声認識終了" (Japanese words meaning, "voice recognition end").

In step S951, in response to receiving text data indicating "音声認識終了" (Japanese words meaning, "voice recognition end") in step S950, the data transmission and reception unit 702 transmits an interactive session end notification to the voice control device 100.

In step S952, in response to the data transmission and reception unit 602 receiving the interactive session end notification in step S951, the display unit 606 of the voice control program 601 turns off the LED to represent a waiting state of the voice control device 100.

In step S953, in response to receiving the interactive session end notification in step S951, the voice control device 100 transitions to a waiting state.

Furthermore, in the sequence diagram, even if an LED indicating response processing being in progress is in the process of blinking, a waking word is able to be input at all times. After uttering a waking word, the user 106 can utter, for example, "キャンセル" (a Japanese word meaning, "cancel") or "中止" (a Japanese word meaning, "stop") to forcibly end the interactive session.

<Voice Operation Start Processing Sequence of Voice Recognition System>

Figure 9B:
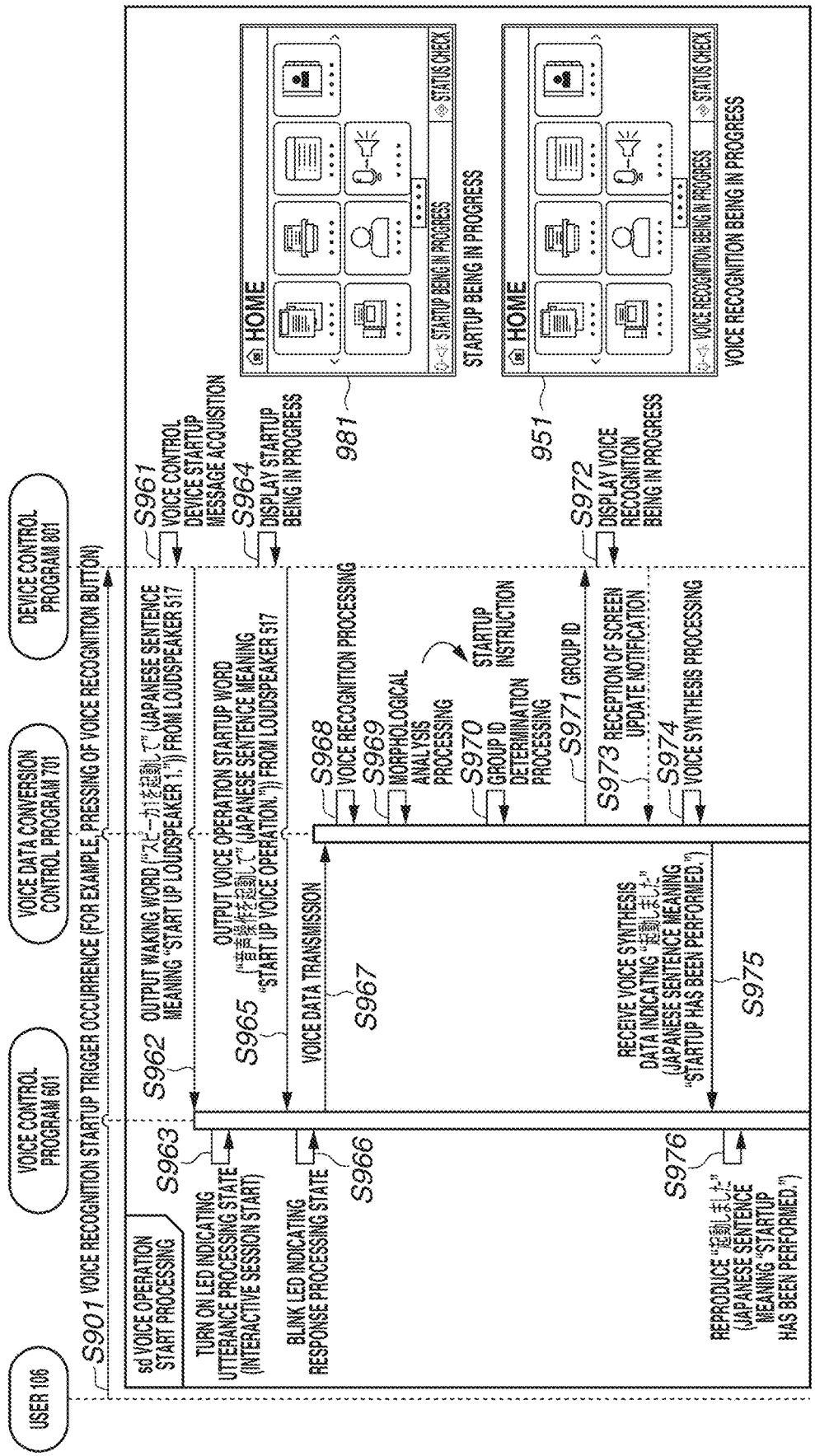
FIG. 9B is a diagram illustrating a startup sequence performed between devices that constitute the voice recognition system.

FIG. 9B is a sequence diagram concerning voice operation start processing illustrated in FIGS. 9Aa, 9Ab, and 9Ac.

Step S901 has been described with reference to FIG. 9Aa and is, therefore, omitted from description here. Furthermore, in the description of the first exemplary embodiment, an instruction for starting a voice operation (a voice recognition startup trigger) is assumed to have been issued by the user 106 pressing the voice recognition button 201. The voice recognition startup trigger, which is described below, can be another trigger, such as pressing of the copy button 203, placement of a document onto the scanner 515 (document detection), or reception of a secure job for page-description language (PDL) printing.

In step S961, using a program stored in the data management unit 803, the device control program 801 reads out a waking word for the voice control device 100 and a startup word for a voice operation from the external storage device 505.

Waking words for the voice control device 100 are stored in the external storage device 505 while being associated with device names or product names of voice control devices as shown in "Table-A Waking word setting for voice control devices" in the following Table 1. In the Table 1, the device control program 801 reads out a waking word for a device the setting of using or not using of which is set to "using". In the first exemplary embodiment, a loudspeaker 5000 is started up in response to a waking word indicating "スピーカ1を起動して" (a Japanese sentence meaning, "Startup loudspeaker 1."). A loudspeaker 5001 is started up in response to a waking word indicating "スピーカ2を起動して" (a Japanese sentence meaning, "Startup loudspeaker 2."). Furthermore, in a case where a waking word for a loudspeaker 5002 has been customized, such a case can be met by providing manual input setting for a waking word and allowing a waking word to be manually input (here, "M F P 起きて" (a Japanese sentence meaning, "Multifunction peripheral (MFP), wake up."). Moreover, in a case where two or more voice control devices are used, waking words for the voice control device 100 can be allocated and used for the respective functions intended to be used and for the respective users. In this case, different users are able to remotely perform a voice operation on the image forming apparatus 101 at the voice control devices 100 located away from the image forming apparatus 101.

TABLE 1

Table-A Waking word setting for voice control device

| Device name or Product name | Waking word | Using or not using |
|---|---|---|
| Loudspeaker 5000 | "スピーカ1を起動して" (a Japanese sentence meaning, "Startup loudspeaker 1.") | Using |
| Loudspeaker 5001 | "スピーカ2を起動して" (a Japanese sentence meaning, "Startup loudspeaker 2.") | not using |
| ... | ... | not using |
| Loudspeaker 5002 | "MFP 起きて" (a Japanese sentence meaning, "MFP, wake up.") (manual input) | not using |

In step S962, the device control program 801 causes the loudspeaker control unit 809 to convert the waking word for the loudspeaker 5000, "スピーカ1 を起動して" (a Japanese sentence meaning, "Startup loudspeaker 1."), read out in step S961 into voice data and output the voice data from the loudspeaker 517 via the audio I/F 516. The voice control device 100 generates, as voice data, a voice acquired by the voice acquisition unit 604, and, when the voice data is detected as a waking word by the voice operation start detection unit 607, the voice control unit 609 transitions to an interactive session start state.

In step S963, the display unit 606 of the voice control program 601 turns on an LED which indicates utterance processing being in progress, and starts processing for causing the data transmission and reception unit 602 to transmit the voice data acquired by the voice acquisition unit 604 to the cloud server 102 (interactive session start).

In step S964, the display unit 806 of the device control program 801 displays startup being in progress 981 in the status displaying 205 of the touch panel 200.

In step S965, the device control program 801 causes the loudspeaker control unit 809 to output the voice operation startup word "音声操作を起動して" (a Japanese sentence meaning, "Startup voice operation.") read out in step S961 from the loudspeaker 517 via the audio I/F 516. With this processing, a voice operation service for the image forming apparatus 101 which is performed by the cloud server 102 is provided.

Voice operation startup words for the voice control device 100 are stored in the external storage device 505 while startup triggers, voice operations, and the voice operation startup words are associated with each other as shown in "Table-B Voice operation startup setting for voice control device" in the following Table 2.

A voice recognition button 6010 serving as a startup trigger in Table 2 is associated with voice recognition (FNC00008) as a voice operation performed when the voice recognition button 201 has been pressed, and the associated voice operation startup word for the voice control device 100 is set as "音声操作を起動して" (a Japanese sentence meaning, "Startup voice operation."). Additionally, an ending trigger for determining ending of the voice operation is also set while being associated with the startup trigger. For example, an ending trigger for the voice recognition button 6010 is also set as ending of the voice operation using voice recognition performed by pressing of the voice recognition button 201. In the following description, respective startup triggers 6010 to 6015 are described.

The voice recognition button 6010 is associated with voice recognition (FNC00008) and startup (OPR00021) as a voice operation performed when the voice recognition button 201 has been pressed, and the associated voice operation startup word for the voice control device 100 is set as "音声操作を起動して" (a Japanese sentence meaning, "Startup voice operation."). Additionally, an ending trigger for determining ending of the voice operation is also set while being associated with the startup trigger. For example, an ending trigger for the voice recognition button 6010 is also set as ending of the voice operation using voice recognition performed by pressing of the voice recognition button 201.

A user login 6011 in Table 2 is associated with authentication (FNC00009) and startup (OPR00021) as a voice operation performed when the login button 202 for user login has been pressed, and the associated voice operation startup word for the voice control device 100 is set as "ログインを起動して" (a Japanese sentence meaning, "Startup login."). Additionally, an ending trigger for the user login 6011 is logout, and, when pressing of a logout button (not illustrated) displayed in a screen obtained after login has been detected, the voice operation using voice recognition ends.

A copy button 6013 in Table 2 is associated with copy (FNC00001) as a voice operation performed when the copy button 203 has been pressed, and the associated voice operation startup word for the voice control device 100 is set as "コピーして" (a Japanese sentence meaning, "Perform copying."). Furthermore, in a case where the voice operation has only a single function, a word for an operation indicating "起動" (a Japanese word meaning, "startup") (OPR00021) serving as a voice operation startup word is assumed to be omissible. The ending trigger is set as printing end in which printing for copy execution ends, and, at the time of printing end, the voice operation using voice recognition ends.

A document detection 6014 in Table 2 is associated with scan (FNC00003) as a voice operation performed when placement of a document on a document positioning plate or a sheet feeder of the scanner 515 has been detected, and the associated voice operation startup word for the voice control device 100 is set as "スキャンして" (a Japanese sentence meaning, "Perform scanning."). An ending trigger for the document detection 6014 is set as scanning end, and, at the time of scanning end, the voice operation using voice recognition ends.

A secure print 6015 in Table 2 is associated with printing and spool (FNC00002, FNC00007) as a voice operation performed when a secure print job has been received, and the associated voice operation startup word for the voice control device 100 is set as "印刷ジョブを表示" (a Japanese sentence meaning, "Display a print job."). An ending trigger for the secure print 6015 is set as ending of a printing operation for a secure print job using a print job screen, and, at the time of ending of an operation using the print job screen, the voice operation using voice recognition ends.

TABLE 2

Table-B Voice operation startup setting for voice control device

| Startup trigger | Voice operation | Voice operation startup word | Ending trigger |
|---|---|---|---|
| Voice recognition button 6010 | Voice recognition (FNC00008, OPR00021) | "音声操作を起動して" (a Japanese sentence meaning "Startup voice operation.") | Voice recognition button |
| User login 6011 | Authenticaton (FNC00009, OPR00021) | "ログインを起動して" (a Japanese sentence meaning, "Startup login.") | Logout |
| Copy button 6013 | Copy (FNC00001) | "コピーして" (a Japanese sentence meaning, "Perform copying.") | Printing end |
| Document detection 6014 | Scan (FNC00003) | "スキャンして" (a Japanese sentence meaning, "Perform scanning.") | Scanning end |
| Secure print 6015 | Printing, spool (FCN00002, FNC00007) | "印刷ジョブを表示" (a Japanese sentence meaning, "Display a print job.") | Print job screen operation end |

In step S966, the display unit 606 of the voice control program 601 blinks an LED which indicates a response processing state according to utterance end determination. Moreover, at the same time, the voice acquisition unit 604 ends the processing.

In step S967, the voice control program 601 transmits voice data indicating "音声操作を起動して" (a Japanese sentence meaning, "Startup voice operation.") acquired in step S965 to the cloud server 102 via the network I/F 306. The voice data to be transmitted in step S967 is an example of start data in the first exemplary embodiment.

In step S968, the voice data conversion control program 701 performs voice recognition processing on the received voice data, and thus generates text data indicating "音声操作を起動して" (a Japanese sentence meaning, "Startup voice operation.") from the voice data.

In step S969, the voice data conversion control program 701 performs morphological analysis processing on the text data generated in step S968.

In step S970, the voice data conversion control program 701 starts up and causes the group ID determination unit 707 to determine a group ID {FNC00009, OPR00021} from the received "音声操作を起動して" (a Japanese sentence meaning, "Startup voice operation.").

In step S971, the voice data conversion control program 701 causes the data transmission and reception unit 702 to transmit the group ID {FNC00009, OPR00021} to the image forming apparatus 101. The device control program 801 receives the group ID {FNC00009, OPR00021} from the data transmission and reception unit 802.

In step S972, the device control program 801 causes display unit 806 to display voice recognition being in progress 982 in the status displaying 205 of the touch panel 200.

In step S973, the voice data conversion control program 701 receives a notification indicating that the screen of the image forming apparatus 101 has been updated and displaying has been switched to the voice recognition being in progress 982 (a screen update notification). For example, the voice data conversion control program 701 receives a notification indicating "voice recognition startup".

In step S974, with respect to the screen update notification received by the data transmission and reception unit 702 of the voice data conversion control program 701, the voice synthesis unit 708 performs voice synthesis processing of predetermined text data corresponding to the contents of the screen update notification. For example, in a case where the contents of the screen update notification are "voice recognition startup", the voice synthesis unit 708 performs voice synthesis of text data indicating "起動しました" (a Japanese sentence meaning, "Startup has been performed.").

In step S975, the data transmission and reception unit 702 transmits, to the voice control device 100, voice synthesis data generated by voice synthesis processing performed by the voice synthesis unit 708.

In step S976, the voice control program 601 causes the voice reproduction unit 605 to reproduce the voice synthesis data received in step S975. For example, the voice reproduction unit 605 reproduces voice synthesis data indicating "起動しました" (a Japanese sentence meaning, "Startup has been performed.") generated in step S974 via the loudspeaker 310.

As described above, as illustrated in FIGS. 9Aa, 9Ab, and 9Ac, a waking word and a voice operation start word are output as voices from the loudspeaker 517 of the image forming apparatus 101 based on a voice recognition startup trigger shown in Table 2, so that the user can start an interactive session with a voice control device without making an utterance. Moreover, waking words are stored in the image forming apparatus while being associated with device names or product names of voice control devices, so that the user can perform a voice operation of the image forming apparatus in combination with various voice control devices.

<Processing Flow of Device Control Program for Image Forming Apparatus>

Figure 10:
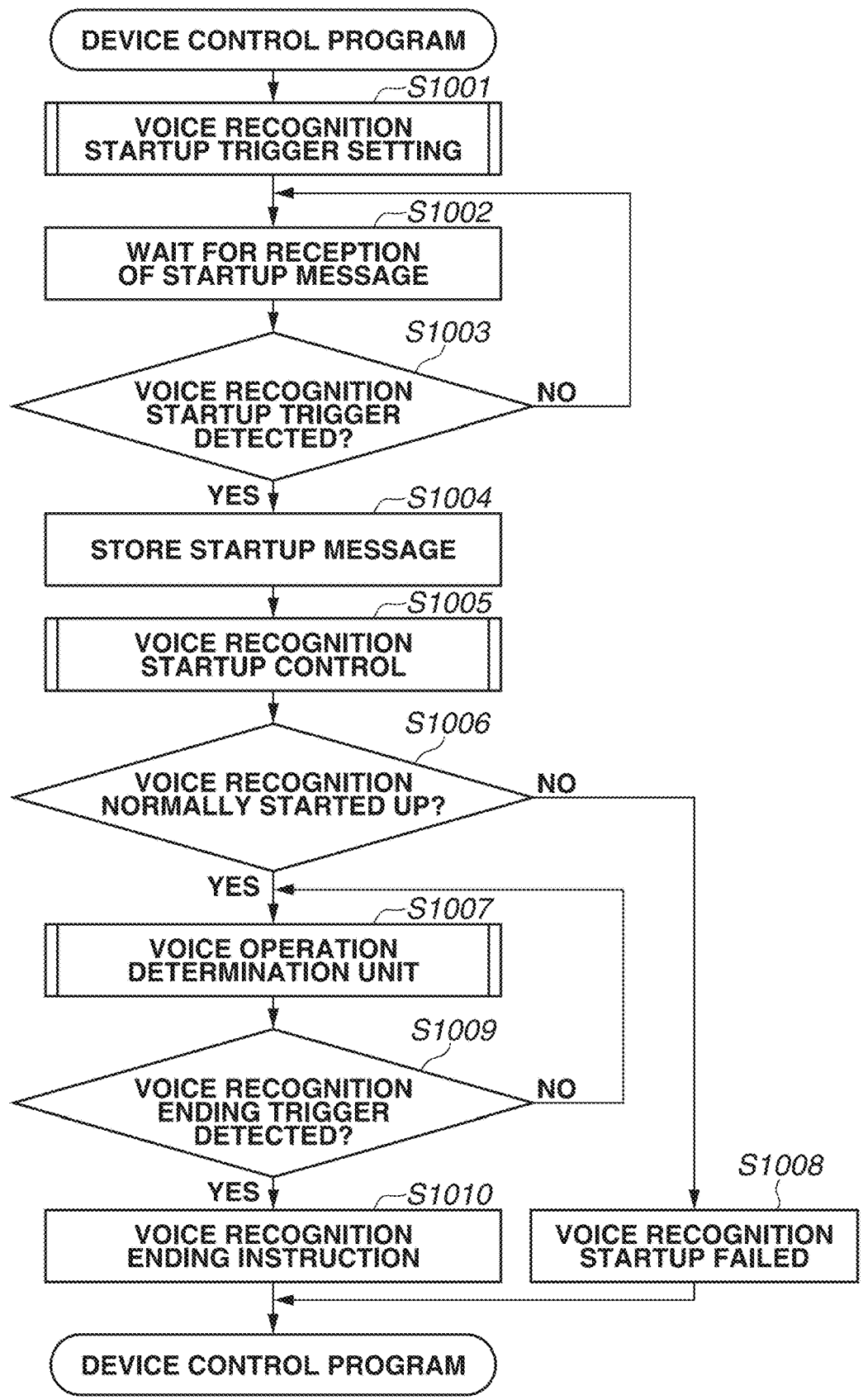
FIG. 10 is a flowchart illustrating a device control program for the image forming apparatus.

FIG. 10 is a flowchart illustrating an outline of processing which the device control program 801 for the image forming apparatus 101 performs. The device control program 801 is stored in a storage unit that is any one of the RAM 503, the ROM 504, and the external storage device 505 of the image forming apparatus 101, and executed by the CPU 502. In the first exemplary embodiment, the device control program 801 is controlled by a real-time operating system (OS), and is able to be executed in parallel with use of, for example, interrupt, transmission and reception of a message, event processing, and task switches between respective programs.

In step S1001, the device control program 801 causes the device control unit 808, which has set a startup trigger for voice recognition, to perform startup control for voice recognition in response to detection of the startup trigger. Setting of the startup trigger is described below with reference to a flowchart for voice recognition startup trigger setting illustrated in FIG. 11.

In step S1002, the device control unit 808 waits for reception of a startup message, which indicates that the startup trigger has occurred. The startup message is data which is transmitted, when the startup trigger has been detected, from each control unit in which the startup trigger has been detected, and at least retains information indicating a source of occurrence of the startup trigger (for example, the operation panel 509) and the content of the startup trigger (the voice recognition button 6010).

In step S1003, the device control unit 808 determines whether the startup trigger for voice recognition has been detected, and, if it is determined that the startup trigger for voice recognition has been detected (YES, in step S1003), the device control unit 808 advances the processing to step S1004. If it is determined that the startup trigger for voice recognition has not been detected (NO in step S1003), the device control unit 808 returns the processing to step S1002. Furthermore, in a case where the startup trigger for voice recognition has not been detected, the device control unit 808 performs other message processing operations (for example, screen operation, job control, and network monitoring).

In step S1004, the device control unit 808 stores the startup message in the RAM 503.

In step S1005, the device control unit 808 performs voice recognition startup control for the voice control device 100. The voice recognition startup control is described below with reference to a flowchart for a voice recognition startup flow illustrated in FIG. 12.

In step S1006, the device control unit 808 determines whether voice recognition has normally started up, and, if it is determined that voice recognition has normally started up (YES in step S1006), the device control unit 808 advances the processing to step S1007. And if it is determined that voice recognition has failed in starting up (NO in step S1006), the device control unit 808 advances the processing to step S1008.

In step S1007, the device control unit 808 performs control of a voice operation using voice recognition. Details of the voice recognition control are described below with reference to the flowchart of FIG. 13.

In step S1008, the device control unit 808 causes the display unit 806 to display a startup message response indicating that startup of voice recognition is failed. When startup of voice recognition is failed, the device control unit 808 in the first exemplary embodiment notifies the user by the display unit 806 performing displaying indicating that startup of voice recognition is failed in the status displaying 205. Moreover, the device control unit 808 can transmit a message to the loudspeaker control unit 809, thus causing the loudspeaker 517 to output a voice indicating "起動に失敗しました" (a Japanese sentence meaning, "Startup is failed.").

In step S1009, the device control unit 808 determines whether an ending trigger for voice recognition has been detected during voice recognition control. If it is determined that the ending trigger has been detected (YES in step S1009), the device control unit 808 advances the processing to step S1010 and, if it is determined that the ending trigger has not been detected (NO in step S1009), the device control unit 808 returns the processing to step S1007.

In step S1010, the device control unit 808 transmits a message for a voice recognition ending instruction to the display unit 806, thus deleting displaying of voice recognition being in progress. Moreover, the device control unit 808 can transmit a message to the loudspeaker control unit 809, thus causing the loudspeaker 517 to output a voice indicating "音声認識を終了しました" (a Japanese sentence meaning, "Voice recognition has ended.").

Thus far is the description of a flowchart concerning a voice operation of the device control program 801 for the image forming apparatus 101. The image forming apparatus 101 processes startup of the voice control device 100 by performing processing in step S1005, thus making it unnecessary to perform startup of the voice control device 100 by the user's uttering. Additionally, the image forming apparatus 101 determines ending of voice recognition control by an ending trigger associated with a startup trigger for voice operation, thus enabling the user to end the voice control device 100 without making an utterance.

<Processing Flow of Voice Recognition Startup Trigger Setting of Image Forming Apparatus>

Figure 11:
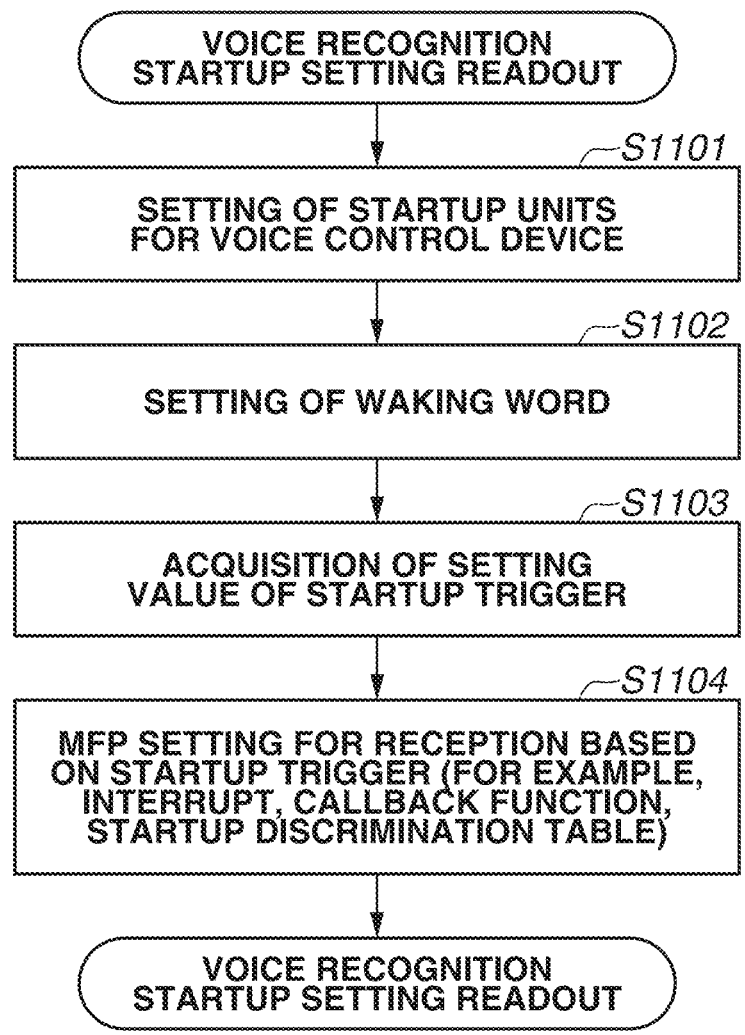
FIG. 11 is a flowchart illustrating voice recognition startup trigger setting in the image forming apparatus.

FIG. 11 is a flowchart illustrating an outline of readout processing for voice recognition startup setting of the device control program 801 for the image forming apparatus 101. In the readout processing for voice recognition startup setting, the data management unit 803 reads out settings concerning waking words, voice operation startup words, and startup units shown in Table 1, Table 2, and Table 3 from the external storage device 505.

In step S1101, the data management unit 803 reads out settings of startup units for the voice control device 100 from the external storage device 505. The settings of startup units for the voice control device 100 are stored in the external storage device 505 while startup units for the voice control device 100, using or not using of the startup unit, and priority orders are associated with each other as shown in "Table-C Setting of startup unit for voice control device" in the following Table 3, and are read out at the time of startup. The setting of using or not using of startup units includes various settings prepared according to input units of the voice control device 100.

In a case where using a plurality of startup units is set, the plurality of startup units is executed based on the priority orders, and a communication with the voice control device is performed by a startup unit which has first started up. Moreover, in a case where there is a plurality of voice control devices 100, setting of a startup unit can be prepared for each voice control device. Additionally, the priority orders can be set as able to be designated by the user, and, in a case where there is a plurality of input units for the voice control device 100, the user is allowed to select an input unit which the user wants to use. For example, in a case where the user wants to perform a voice operation using voice recognition without outputting a voice, an operation of lowering the priority order of a startup unit using voice input to "5" and raising the priority orders of the other startup units to "1" to "4" enables performing a voice operation without outputting a voice from the loudspeaker.

Furthermore, while, in the first exemplary embodiment, the microphone 308 and the network 104 are illustrated as an input unit for starting up a voice control device, the voice control device can be started up by an input unit using Bluetooth® Low Energy (BLE) (not illustrated) or infrared light (not illustrated).

TABLE 3

Table-C Setting of startup unit for voice control device

| Startup unit for voice control device | Using or not using of startup unit | Priority order |
| --- | --- | --- |
| Voice input | Using | 5 |
| Network (wired) | Using | 1 |
| Network (wireless) | Using | 2 |
| BLE | Not using | 3 |
| Infrared light | Not using | 4 |

In step S1102, the data management unit 803 reads out startup setting of the voice control device 100 from the external storage device 505, and stores the read-out startup setting in the RAM 503. The startup setting of the voice control device 100 corresponds to the contents described with reference to Table 1.

In step S1103, the data management unit 803 reads out voice recognition startup setting of the voice control device 100 from the external storage device 505, and stores the read-out voice recognition startup setting in the RAM 503. The voice recognition startup setting corresponds to the contents described with reference to Table 2.

In step S1104, the data management unit 803 sets, based on a startup trigger for the voice recognition startup setting read out in step S1103, for example, interrupt, a callback function, and a startup discrimination table which are required for the voice operation determination unit 807 to perform starting of voice recognition at the time of detection of the startup trigger. For example, when pressing of the voice recognition button 201 of the touch panel 200 has been detected, the data management unit 803 performs setting of a callback function for notifying the voice operation determination unit 807 of a voice operation start instruction. Besides, when a document being placed on the scanner 515 has been detected by the scan unit 804 via the scan controller 514, the data management unit 803 performs interrupt setting of the CPU 502 to notify the voice operation determination unit 807 of a voice operation start instruction.

As described above, according to the flowchart of FIG. 11, the image forming apparatus 101 reads out, from the external storage device 505, various settings for starting up voice recognition using the voice control device 100 at the time of startup, and performs setting for executing a voice operation start instruction at the time of detection of a startup trigger. The present flowchart enables various input units for a voice control device, startup conditions, and voice operations to be associated with each other.

<Processing Flow of Voice Recognition Startup Control for Image Forming Apparatus>

Figure 12:
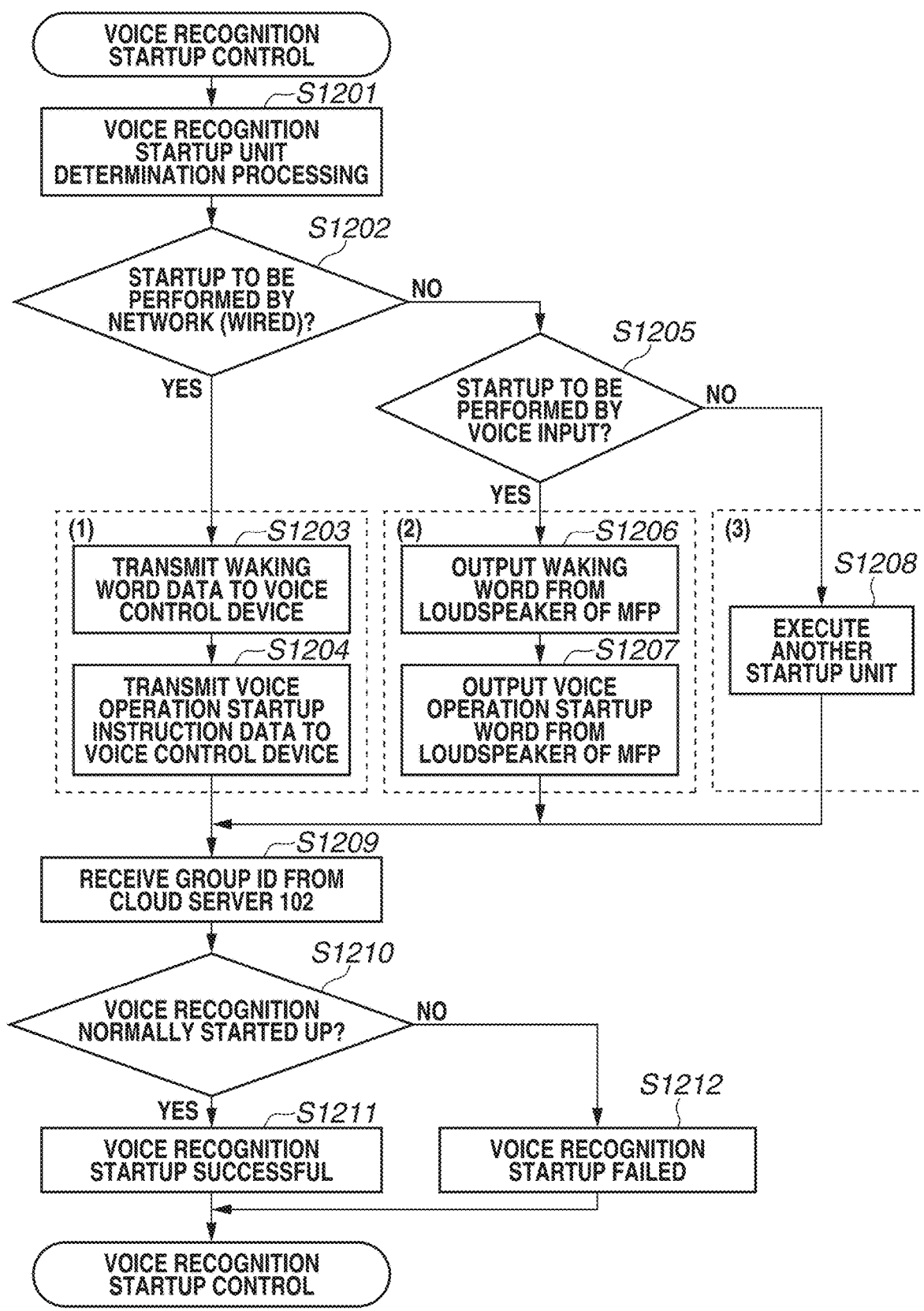
FIG. 12 is a flowchart illustrating voice recognition startup control in the image forming apparatus.

FIG. 12 is a flowchart illustrating an outline of voice recognition startup control of the device control program 801 for the image forming apparatus 101.

In step S1201, the device control program 801 performs startup unit determination processing for voice recognition. The startup unit determination processing executes a startup unit the using setting of which is "using" in the order of priority order settings "1" to "5" for setting of startup units for the voice control device shown in Table 3, stores information indicating the executed startup unit in the RAM 503, and uses the executed startup unit for determination to be performed in subsequent steps S1202 and S1205. Furthermore, step S1201 can be performed after step S1104 for voice recognition startup setting readout illustrated in FIG. 11, information indicating which startup unit is to be used for execution can be stored in the external storage device 505, and, in step S1201, the stored information indicating the startup unit can be read out from the external storage device 505 and then stored in the RAM 503. Moreover, only in a case where a plurality of startup units is able to be used, startup units included in blocks (1), (2), and (3) illustrated in FIG. 12 can be executed based on the priority orders and a startup unit which has started up the earliest can be used. Here, the blocks (1), (2), and (3) surrounded by dashed lines represent startup processes for the respective startup units. Although not illustrated, the process indicated by the block (3) performs startup processing using, for example, BLE or infrared light.

In step S1202, the device control program 801 reads out a startup unit stored in step S1201, and, if it is determined that the stored startup unit is startup being performed by a network (wired) (YES in step S1202), the device control program 801 advances the processing to step S1203 and, if it is determined that the stored startup unit is not startup being performed by a network (wired) (NO in step S1202), the device control program 801 advances the processing to step S1205.

In step S1203, the device control program 801 causes the data transmission and reception unit 802 to transmit a voice control startup command (or voice data) to the voice control device 100 via a network (wired) and then receive a voice control startup response from the voice control device 100.

In step S1204, the device control program 801 transmits "音声認識起動" (a Japanese phrase meaning, "voice operation startup") to the voice control device 100 based on the voice recognition startup setting shown in Table 2, and then receives a voice operation startup response from the voice control device 100.

In step S1205, the device control program 801 reads out a startup unit stored in step S1201, and, if it is determined that the stored startup unit is startup being performed by a voice input (YES in step S1205), the device control program 801 advances the processing to step S1206 and, if it is determined that the stored startup unit is not startup being performed by a voice input (NO in step S1205), the device control program 801 advances the processing to step S1208.

In step S1206, the device control program 801 causes the loudspeaker control unit 809 to output voice data indicating a waking word ("スピーカ1を起動して" (a Japanese sentence meaning, "Startup loudspeaker 1") from the loudspeaker 517.

In step S1207, the device control program 801 causes the loudspeaker control unit 809 to output voice data indicating a voice operation startup word ("音声操作起動" (a Japanese phrase meaning, "voice operation startup") from the loudspeaker 517.

In step S1208, the device control program 801 executes another startup unit (a network (wireless), BLE, or infrared light) based on the startup unit determined in step S1201. Such another startup unit is a process similar to the process in the block (1) or (2) and is, therefore omitted from description.

In step S1209, the device control program 801 receives a group ID from the cloud server 102.

In step S1210, the device control program 801 determines whether voice recognition has normally started up based on the received group ID, and, if it is determined that voice recognition has normally started up (YES in step S1210). The device control program 801 advances the processing to step S1211 and, if it is determined that voice recognition has not normally started up (NO in step S1210), the device control program 801 advances the processing to step S1212.

In step S1211, the device control program 801 displays that startup of voice recognition is successful in the screen 951 indicating voice recognition being in progress.

In step S1212, the device control program 801 displays that startup of voice recognition is failed as "音声認識に失敗しました" (a Japanese sentence meaning, "Voice recognition is failed") in the status displaying 205 in the screen of the image forming apparatus 101, thus notifying the user.

As described above, performing voice recognition startup control illustrated in FIG. 12 enables performing startup control for each startup unit for voice recognition with respect to startup of the voice control device. Moreover, while, in the description of the first exemplary embodiment, two startup units are used, in a case where startup is to be performed using only a voice input, such a case can be implemented by setting the setting of startup units for a voice control device shown in Table 3 to using only a voice input in such a manner that startup is performed always in step S1205.

<Processing Flow of Voice Operation Determination for Image Forming Apparatus>

Figure 13:
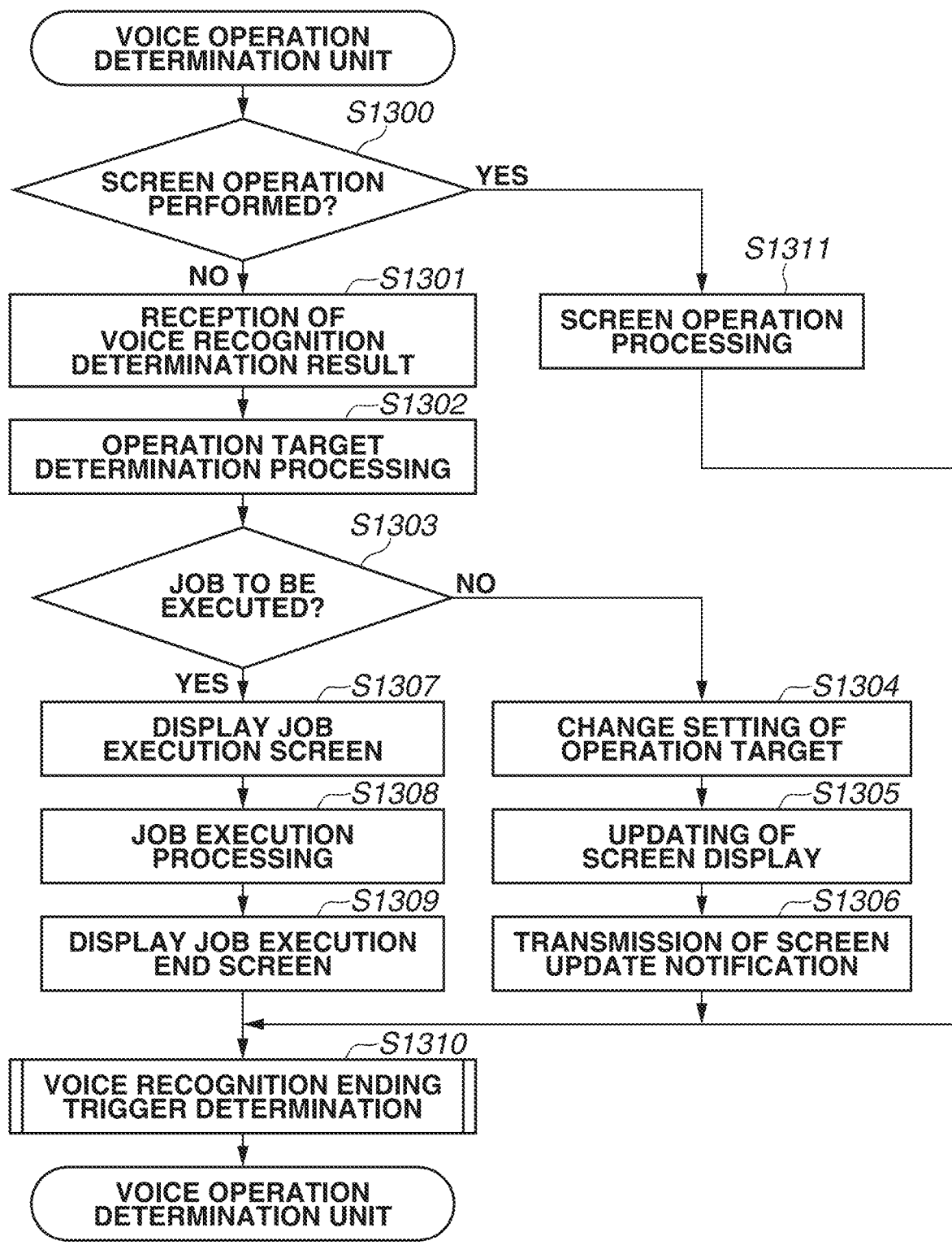
FIG. 13 is a flowchart illustrating voice recognition control in the image forming apparatus.

FIG. 13 is a flowchart illustrating an outline of the voice operation determination unit 807 of the device control program 801 for the image forming apparatus 101.

In step S1300, the voice operation determination unit 807 determines whether there is a touch on the screen of the touch panel 200, and, if it is determined that there is a touch on the screen of the touch panel 200 (a screen operation) (YES in step S1300). The voice operation determination unit 807 advances the processing to step S1311 and, if it is determined that there is no screen operation (NO in step S1300), the voice operation determination unit 807 advances the processing to step S1301.

In step S1301, the voice operation determination unit 807 receives a group ID as a voice recognition determination result received by the data transmission and reception unit 802.

In step S1302, the voice operation determination unit 807 determines whether the received group ID is a group ID targeted for operation in the screen displayed on the touch panel 200 by the display unit 806. Moreover, in a case where the received group ID is a group ID targeted for operation, the voice operation determination unit 807 stores the received group ID as an operation group ID in the RAM 503.

In step S1303, if it is determined from the received group ID is that a job is to be executed (YES in step S1303), the voice operation determination unit 807 advances the processing to step S1307. Whereas, if it is determined that a job is not to be executed (NO in step S1303), the voice operation determination unit 807 advances the processing to step S1304. For example, in a case where the received group ID is a group ID for pressing of the start key in the copy screen as in step S935, it is determined that a job is to be executed (YES in step S1303). For example, in a case where the received group ID is a group ID for the setting change instruction "A4" in the paper selection screen as in step S925, it is determined that a job is not to be executed (NO in step S1303).

In step S1304, the voice operation determination unit 807 changes setting of an operation target.

In step S1305, the voice operation determination unit 807 instructs the display unit 806 to perform updating to a screen display in which a change of the setting performed in step S1304 has been reflected.

In step S1306, the voice operation determination unit 807 causes the data transmission and reception unit 802 to transmit a notification indicating that displaying of the touch panel 200 has been updated to the cloud server 102.

In step S1307, the voice operation determination unit 807 instructs the display unit 806 to display a job execution screen 955 for a copy job. For example, the display unit 806 displays a job execution screen 955 for a copy job on the touch panel 200.

In step S1308, the voice operation determination unit 807 instructs the device control unit 808 to perform execution processing of the job.

In step S1309, the voice operation determination unit 807 receives ending of the execution processing of the job from the device control unit 808, notifies the display unit 806 of the execution ending of the job, and closes the job execution screen 955. Thus, for example, the display unit 806 displays the copy screen 952, which is displayed in step S912.

In step S1310, the voice operation determination unit 807 performs processing for determining whether an ending trigger for ending voice recognition has occurred (ending trigger determination processing). The ending trigger determination processing is described below with reference to the flowchart of FIG. 14.

In step S1311, the display unit 806 performs processing a screen operation, determines a group ID corresponding to the operated processing, retains the determined group ID as an operation group 1D in the RAM 503, and uses the operation group ID for ending trigger determination to be performed in step S1310.

As described above, according to the flowchart for the voice operation determination unit 807 illustrated in FIG. 13, receiving a group ID serving as a voice recognition result from the cloud server 102 enables performing an operation on the image forming apparatus 101 based on voice data input from the voice control device 100.

<Processing Flow of Voice Recognition Ending Trigger Determination for Image Forming Apparatus>

Figure 14:
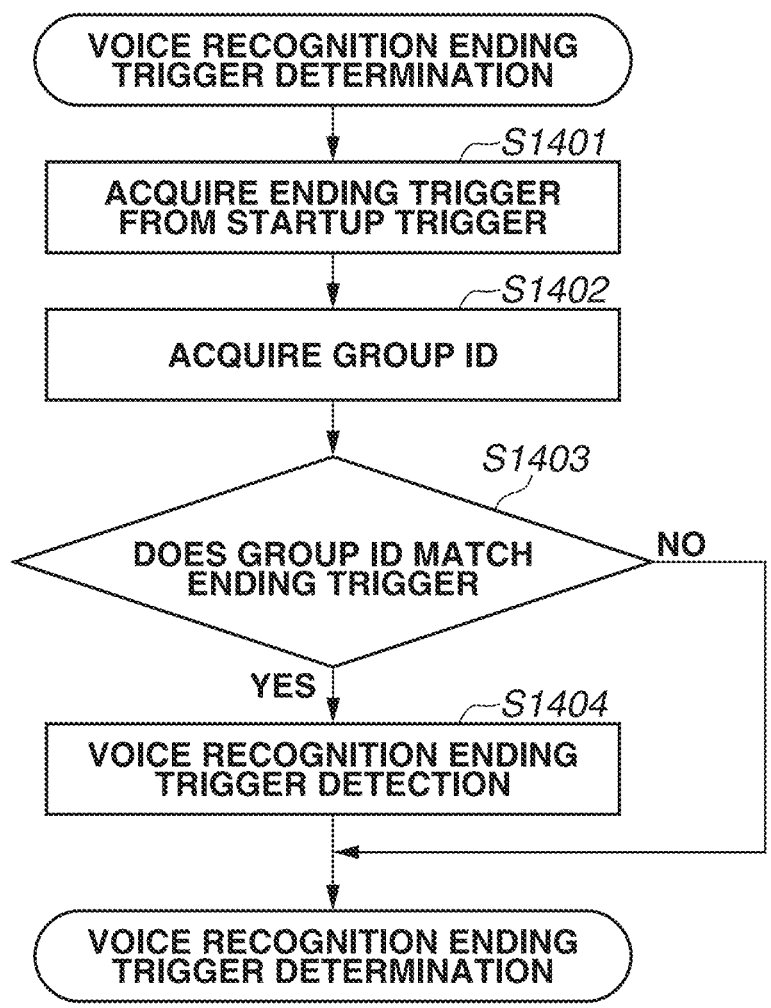
FIG. 14 is a flowchart illustrating voice recognition ending trigger determination in the image forming apparatus.

FIG. 14 is a flowchart illustrating an outline of voice recognition ending trigger determination of the device control program 801 for the image forming apparatus 101. As described with reference to FIG. 13, after performing execution of the job and changing of the screen using voice recognition, the voice operation determination unit 807 performs ending trigger determination for voice recognition, thus determining whether to end a voice operation using the voice control device 100.

In step S1401, the voice operation determination unit 807 acquires a startup trigger from the startup message stored in step S1004, and then acquires an ending trigger matching the startup trigger in the voice operation startup setting shown in Table 2. For example, in a case where the startup trigger is the voice recognition button 6010, pressing of the voice recognition button is acquired as the ending trigger.

In step S1402, the voice operation determination unit 807 acquires an operation group ID stored in the RAM 503 in step S1302 or S1311.

In step S1403, the voice operation determination unit 807 determines whether the group ID acquired in step S1402 matches the ending trigger. If it is determined that the group ID matches the ending trigger (YES, in step S1403), the voice operation determination unit 807 advances the processing to step S1404, and, if it is determined that the group ID does not match the ending trigger (NO, in step S1403), the voice operation determination unit 807 ends the processing.

Here, the method of discriminating the ending trigger is described. For example, in a case where the ending trigger is ending of printing, the voice operation determination unit 807 discriminates a job type from the function number (copy: FNC00001) and the operation number (start: OPR00012) at the time of job execution, and determines whether printing has ended from the ended job type. For example, in a case where the ending trigger is a voice recognition button, the voice operation determination unit 807 discriminates which function button has been pressed from the function number (voice recognition: FNC00009) operated via the screen, and determines whether the function button matches pressing of a voice recognition button serving as an ending trigger.

In step S1404, the voice operation determination unit 807 notifies step S1009 in the higher-level flow that the voice recognition ending trigger has been detected.

Performing the above-described ending trigger determination for voice recognition at the time of a screen operation and at the time of ending of a job enables preventing voice recognition from continuing operating. Moreover, associating a startup trigger and an ending trigger with each other enables performing a voice operation corresponding to a function which the user wants to use.

<Processing Flow of Voice Control Program for Voice Control Device>

Figure 15:
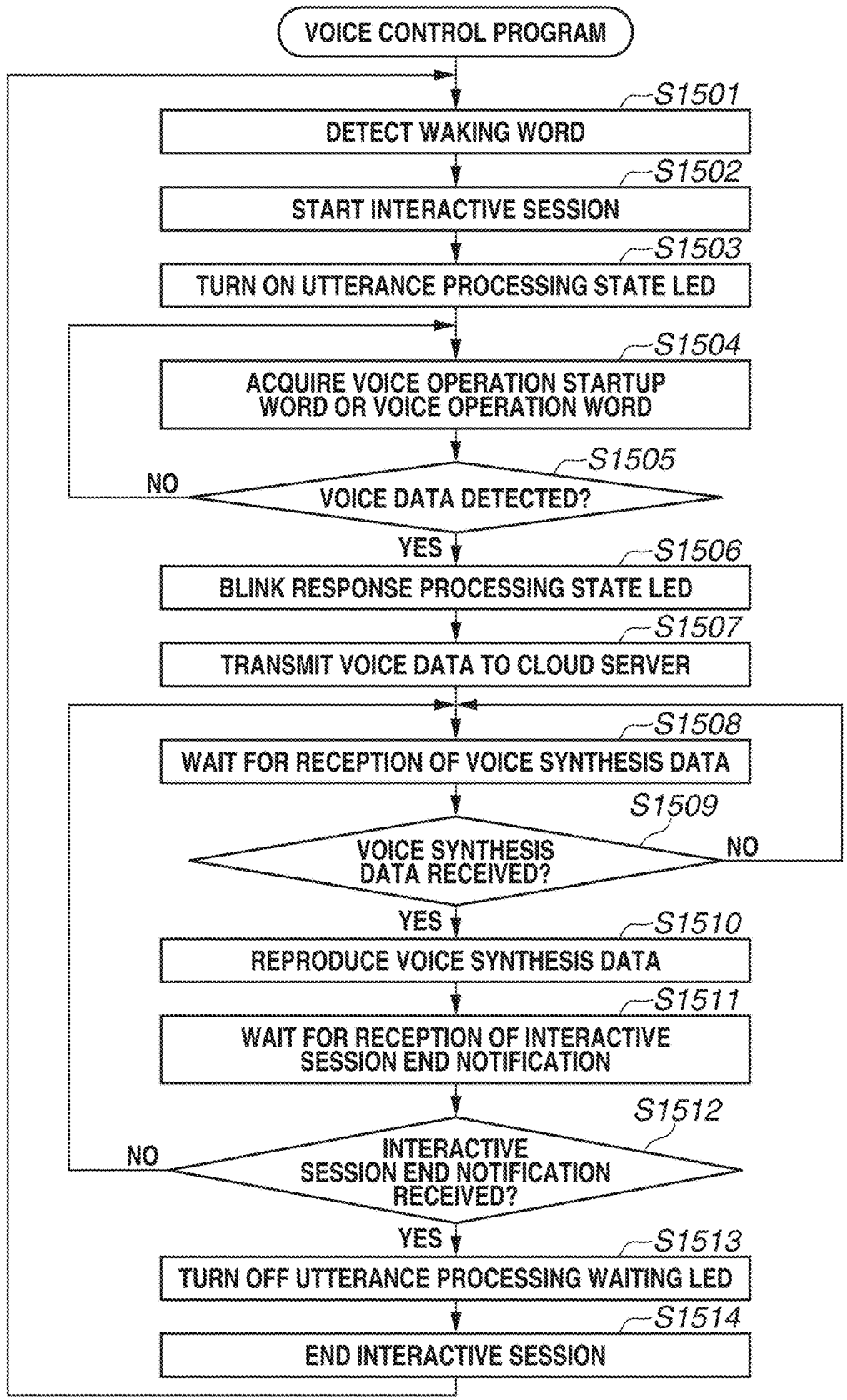
FIG. 15 is a flowchart illustrating a voice control program for the image forming apparatus.

FIG. 15 is a flowchart illustrating an outline of voice control of the voice control program 601 for the voice control device 100.

In step S1501, the voice control program 601 waits for reception of a voice operation start instruction, and, when the voice operation start detection unit 607 has detected that recorded sound data obtained by the microphone 308 matches a waking word, the voice control program 601 advances the processing to step S1502.

In step S1502, the voice control program 601 starts an interactive session (for example, step S963).

In step S1503, the voice control program 601 causes the display unit 606 to turn on an utterance processing state LED.

In step S1504, the voice control program 601 acquires a voice operation startup word or a voice operation word as a voice from the voice acquisition unit 604 or receives such a word as voice data from the data transmission and reception unit 602. In the case of acquiring a voice, the voice control program 601 causes the utterance end determination unit 608 to determine ending of a voice acquired via the voice acquisition unit 604, converts the voice into voice data, and stores the voice data in the external storage device 305. In the case of receiving voice data, the voice control program 601 causes the data management unit 603 to store the received voice data in the external storage device 305.

In step S1505, the voice control program 601 determines whether voice data has been detected, and, if it is determined that voice data has been detected (YES, in step S1505), the voice control program 601 advances the processing to step S1506. And, if it is determined that voice data has not been detected (NO, in step S1505), the voice control program 601 returns the processing to step S1504.

In step S1506, the voice control program 601 causes the display unit 606 to blink a response processing state LED.

In step S1507, the voice control program 601 causes the data transmission and reception unit 602 to transmit the voice data stored in step S1504 to the cloud server 102 via the network I/F 306.

In step S1508, the voice control program 601 waits for reception of voice synthesis data from the data transmission and reception unit 602. Furthermore, if voice synthesis data is not received in a predetermined time, the voice control program 601 advances the processing to a next step.

In step S1509, the voice control program 601 checks whether voice synthesis data has been received. If it is determined that voice synthesis data has been received (YES, in step S1509), the voice control program 601 advances the processing to step S1510. And if it is determined that voice synthesis data has not yet been received or is in the process of being received (NO, in step S1509), the voice control program 601 returns the processing to step S1508.

In step S1510, the voice control program 601 causes the voice reproduction unit 605 to reproduce the voice synthesis data received in step S1508.

In step S1511, the voice control program 601 causes the data transmission and reception unit 602 to wait for reception of data from the cloud server 102.

In step S1512, the voice control program 601 determines whether an interactive session end notification has been received by the data transmission and reception unit 602. If it is determined that the interactive session end notification has been received (YES, in step S1512), the voice control program 601 advances the processing to step S1513. And if it is determined that the interactive session end notification has not been received (NO, in step S1512), the voice control program 601 returns the processing to step S1508.

In step S1513, the voice control program 601 causes the display unit 606 to turn off an utterance processing waiting LED.

In step S1514, the voice control program 601 ends the interactive session, and then returns the processing to step S1501 for waiting for reception of a voice operation start instruction.

<Processing Flow of Voice Data Conversion Program for Cloud Server>

Figure 16:
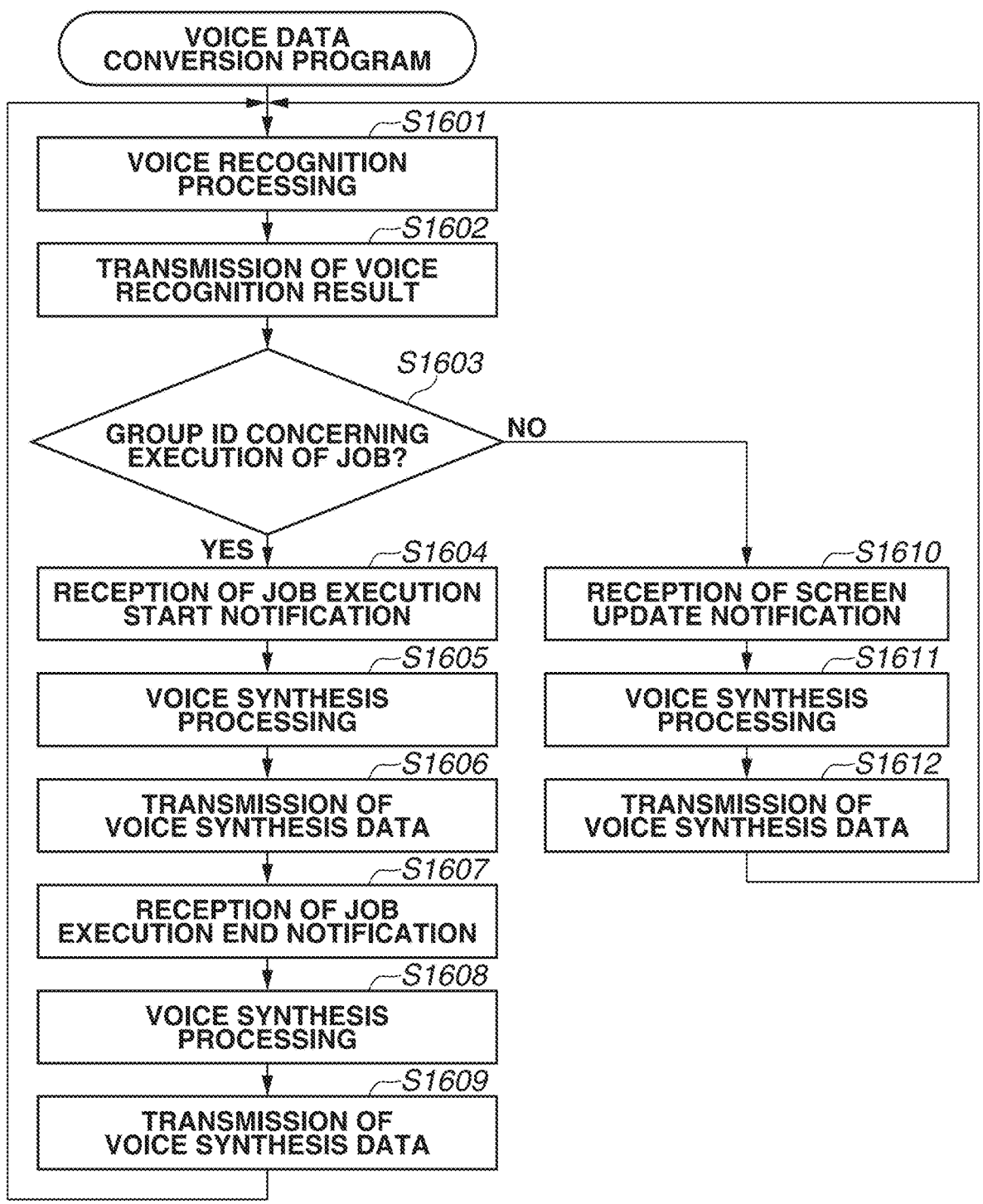
FIG. 16 is a flowchart illustrating a voice data conversion control program for the cloud server.

FIG. 16 is a flowchart illustrating an outline of voice recognition control of the voice data conversion control program 701 for the cloud server 102. Furthermore, a voice operation in the cloud server 102 is performed by the voice data conversion control program 701.

In step S1601, the voice data conversion control program 701 causes the voice recognition unit 705 to perform voice recognition processing on the received voice data, causes the morphological analysis unit 706 to analyze the recognized voice, and causes the group ID determination unit 707 to determine a group ID.

In step S1602, the voice data conversion control program 701 causes the data transmission and reception unit 702 to transmit the group ID determined as a voice recognition result in step S1601 to the image forming apparatus 101.

In step S1603, the voice data conversion control program 701 determines whether the group ID determined in step S1601 is a group ID concerning execution of a job. If it is determined that the determined group ID is a group ID concerning execution of a job (YES, in step S1603), the voice data conversion control program 701 advances the processing to step S1604. And if it is determined that the determined group ID is not a group ID concerning execution of a job (NO, in step S1603), the voice data conversion control program 701 advances the processing to step S1610.

In step S1604, the voice data conversion control program 701 causes the data transmission and reception unit 702 to receive a job execution start notification.

In step S1605, the voice data conversion control program 701 causes the voice synthesis unit 708 to perform voice synthesis processing based on text data communicated with the job execution start notification.

In step S1606, the voice data conversion control program 701 causes the data transmission and reception unit 702 to transmit voice synthesis data generated in step S1605 to the voice control device 100.

In step S1607, the voice data conversion control program 701 causes the data transmission and reception unit 702 to receive a job execution end notification.

In step S1608, the voice data conversion control program 701 causes the voice synthesis unit 708 to perform voice synthesis processing based on text data communicated with the job execution end notification received in step S1607.

In step S1609, the voice data conversion control program 701 causes the data transmission and reception unit 702 to transmit the voice synthesis data generated in step S1608 to the voice control device 100.

In step S1610, the voice data conversion control program 701 causes the data transmission and reception unit 702 to receive a screen update notification.

In step S1611, the voice data conversion control program 701 causes the voice synthesis unit 708 to perform voice synthesis processing based on text data communicated with the screen update notification received in step S1610.

In step S1612, the voice data conversion control program 701 causes the data transmission and reception unit 702 to transmit voice synthesis data generated in step S1611 to the voice control device 100.

Thus far is the description of flow control for voice recognition performed by the voice data conversion control program 701 to perform a voice operation installed on the cloud server 102. In this way, the voice data conversion control program 701 installed on the cloud server 102, preparing the morphological analysis unit 706, the group ID determination unit 707, and the voice synthesis unit 708 according to a voice operation enables dealing with various voice operations for voice recognition. Moreover, the voice data conversion control program 701 causing the data management unit 703 to associate a voice operation and an image forming apparatus with each other enables transmitting a group ID used for performing a voice operation for the image forming apparatus based on the received voice data. Moreover, conversely, the voice data conversion control program 701 receiving a job execution start notification, a job execution end notification, and a screen update notification from an image forming apparatus, generating voice synthesis data, and transmitting the generated voice synthesis data to a voice control device enables the voice control device to output a voice response.

<Data Configuration of Voice Recognition System>

Figure 17:
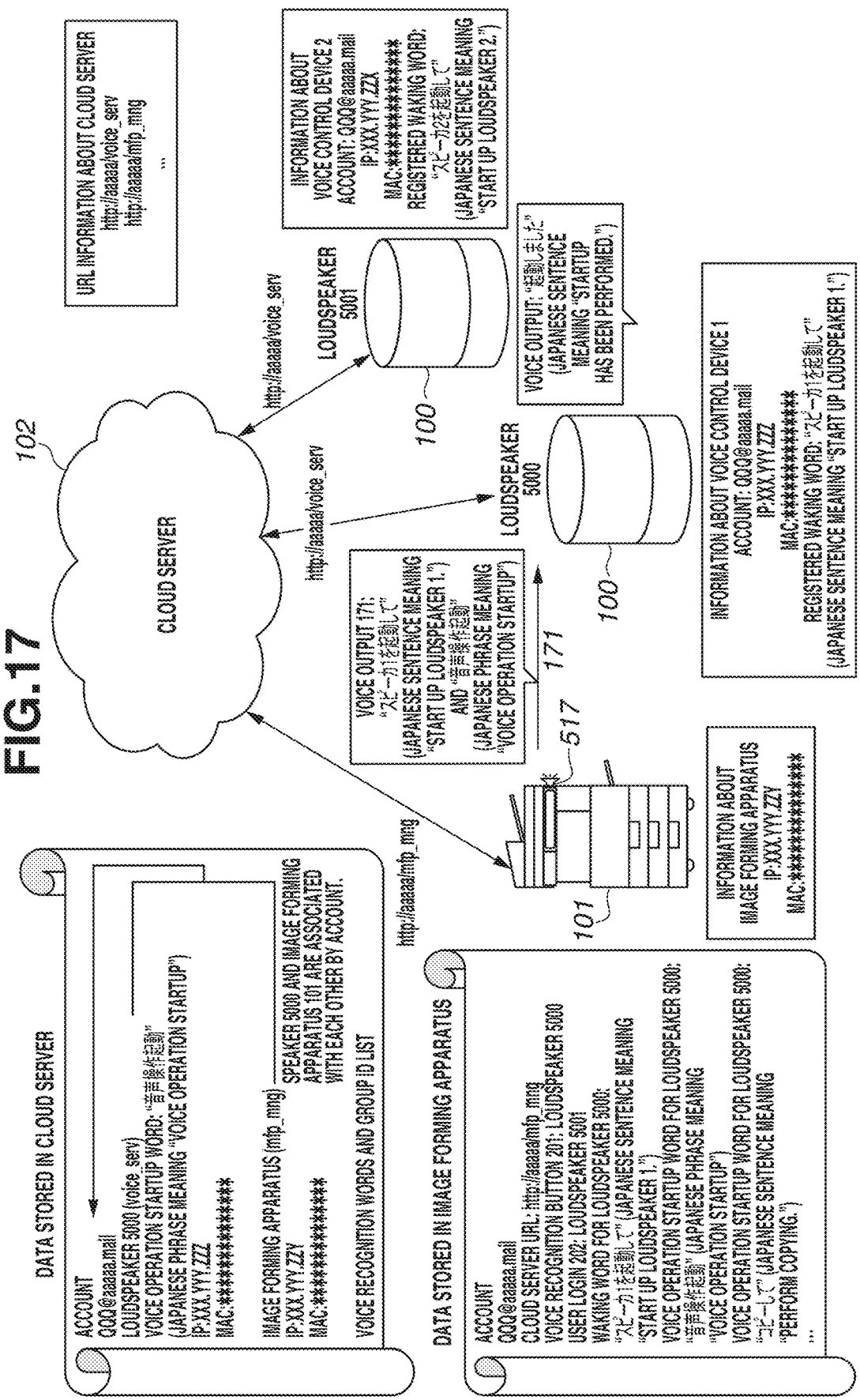
FIG. 17 is a diagram illustrating a data configuration in the voice recognition system.

FIG. 17 is a data configuration diagram illustrating pieces of data stored in respective apparatuses, devices, and a cloud server which constitute a voice recognition system in the first exemplary embodiment.

The cloud server 102, which has two pieces of URL information used to perform a voice operation, performs voice recognition of voice data uttered by a voice operation, determines a group ID based on the generated text data, and then performs control of an image forming apparatus and a voice response thereto based on the group ID. The cloud server 102 (http://aaaaa/voice_serv), which communicates with the voice control device 100, receives voice data from the voice control device 100, performs voice recognition, generates text data, and transmits voice synthesis data as a response to the received voice data. The cloud server 102 (http://aaaaa/mfp_mng), which communicates with the image forming apparatus 101, extracts a group ID from text data, transmits the group ID to the image forming apparatus 101, and then receives a processing result of the group ID from the image forming apparatus 101.

Moreover, the cloud server 102 stores a media access control (MAC) address and an Internet Protocol (IP) address as information about the loudspeaker 5000 (the product name of a voice control device illustrated in FIG. 17) in the external storage device 405 of the cloud server 102. Moreover, the cloud server 102 also stores account information (QQQ@aaaaa.mail) required for the voice control device to access the cloud server 102 in the external storage device 405, and performs communication after performing authentication in accessing the above-mentioned URL. Furthermore, in a case where there is a plurality of voice control devices, the cloud server 102 also stores information about the loudspeaker 5001 in the external storage device 405 of the cloud server 102.

The cloud server 102 stores a MAC address and an IP address as information about the image forming apparatus 101 in the external storage device 405 of the cloud server 102. Moreover, the cloud server 102 also stores account information (QQQ@aaaaa.mail) required for the image forming apparatus 101 to access the cloud server 102 in the external storage device 405.

The loudspeaker 5000 (voice control device 1) stores a MAC address and an IP address in the external storage device 305. Moreover, the loudspeaker 5000 also stores a waking word ("スピーカ1を起動して" (a Japanese sentence meaning "Startup loudspeaker 1.") for starting up voice recognition as voice data in the external storage device 305. Additionally, the loudspeaker 5000 also stores URL information (http://aaaaa/voice_serv) and account information (QQQ@aaaaa.mail) for performing voice recognition, and, after starting up of voice recognition, performs transmission of voice data to the above-mentioned URL.

The image forming apparatus 101 stores URL information (http://aaaaa/mfp_mng) and account information (QQQ@aaaaa.mail) about the cloud server 102 for performing a voice operation in the external storage device 505. Moreover, the image forming apparatus 101 also stores various settings concerning voice recognition startup shown in Table-A to Table-C for starting up voice recognition and a list of group IDs illustrated in FIGS. 7Ba, 7Bb, and 7Bc, which the cloud server 102 stores, in the external storage device 505. Furthermore, the image forming apparatus 101 can be configured to receive the list of group IDs illustrated in FIGS. 7Ba, 7Bb, and 7Bc from the cloud server 102 after performing authentication with the cloud server 102 using the account information. Moreover, to start voice recognition of the loudspeaker 5000, the image forming apparatus 101 also stores voice data for a waking word for the loudspeaker 5000 ("スピーカ1を起動して" (a Japanese sentence meaning, "Startup loudspeaker 1.") and voice data for a waking word for the loudspeaker 5001 ("スピーカ2を起動して" (a Japanese sentence meaning, "Startup loudspeaker 2.") in the external storage device 505. Furthermore, the image forming apparatus 101 can store only text data without storing voice data, and, after transmitting text data to the cloud server 102, receive voice data obtained by voice synthesis processing performed by the cloud server 102, store the voice data in the RAM 503, and then use the voice data for starting up of the voice control device. Moreover, the image forming apparatus 101 stores, for example, "音声操作を起動して" (a Japanese sentence meaning, "Startup voice operation") and "コピーして" (a Japanese sentence meaning, "Perform copying") as voice operation startup words in the external storage device 505. The image forming apparatus 101 can also be configured to receive a voice operation startup word as voice data obtained by voice synthesis from the cloud server 102.

As described above, with regard to various pieces of data mentioned in the first exemplary embodiment, the cloud server 102 performs information processing while associating the voice control device 100 and the image forming apparatus 101 with each other using an account required for performing communication with the cloud server 102, thus enabling a voice operation. Moreover, the image forming apparatus 101 storing a startup word for the voice control device 100 enables starting up of the voice control device 100 to be performed by the image forming apparatus 101.

Moreover, the cloud server 102 storing a voice operation startup word for the image forming apparatus using voice recognition enables the cloud server 102 to notify the image forming apparatus of starting of control of the image forming apparatus after receiving the voice operation startup word. Additionally, the image forming apparatus 101 receiving a waking word and a voice operation startup word from the cloud server 102 enables reducing the size of voice data stored in the external storage device 505 of the image forming apparatus 101 and thus enables performing a voice operation.

A second exemplary embodiment differs from the first exemplary embodiment in voice operation startup processing described with reference to FIG. 9B. The voice operation startup processing in the second exemplary embodiment is described with reference to a sequence diagram for voice operation startup processing illustrated in FIG. 9C.

Processing in steps S961 to S976 is the same as that illustrated in FIG. 9B, and is, therefore, omitted from description here.

In step S980, the device control program 801 transmits a waking word as voice data to the voice control device 100. The voice data to be transmitted here is an example of a waking instruction in the second exemplary embodiment. Furthermore, in a case where a startup command or text data for a waking word for starting up voice recognition of the voice control device 100 is received, the data to be transmitted can be not voice data but a startup command or text data. The voice control program 601 stores the waking word received by the data transmission and reception unit 602 in the RAM 303, and causes the voice operation start detection unit 607 to determine starting of a voice operation.

In step S981, after determining starting of a voice operation, the voice control program 601 transmits a voice control startup response to the image forming apparatus 101. The device control program 801 determines the voice control startup response received via the data transmission and reception unit 802, and, in a case where startup of the voice control device 100 is successful, the device control program 801 notifies the user by displaying "起動中です" (a Japanese phrase meaning, "startup being in progress") in the status displaying 205. In a case where startup of the voice control device 100 is failed, the device control program 801 displays "音声認識起動エラー" (a Japanese phrase meaning, "voice recognition startup error") in the status displaying 205.

In step S982, the device control program 801 transmits a voice operation startup word as voice data to the voice control device 100. This voice data is an example of a startup instruction in the second exemplary embodiment. Furthermore, in a case where a voice operation startup command or text data for a voice operation startup word for starting up a voice operation of the voice control device 100 is received, the data to be transmitted can be not voice data but a voice operation startup command or a voice operation startup word (text data). The voice control program 601 stores a voice operation startup word received via the data transmission and reception unit 602 in the RAM 303.

In step S983, the voice control program 601 transmits a voice operation startup response to the image forming apparatus 101. The device control program 801 determines the voice operation startup response received via the data transmission and reception unit 802, and, in a case where startup of a voice operation is failed, the device control program 801 displays "音声操作起動エラー" (a Japanese phrase meaning, "voice operation startup error") in the status displaying 205.

Figure 9C:
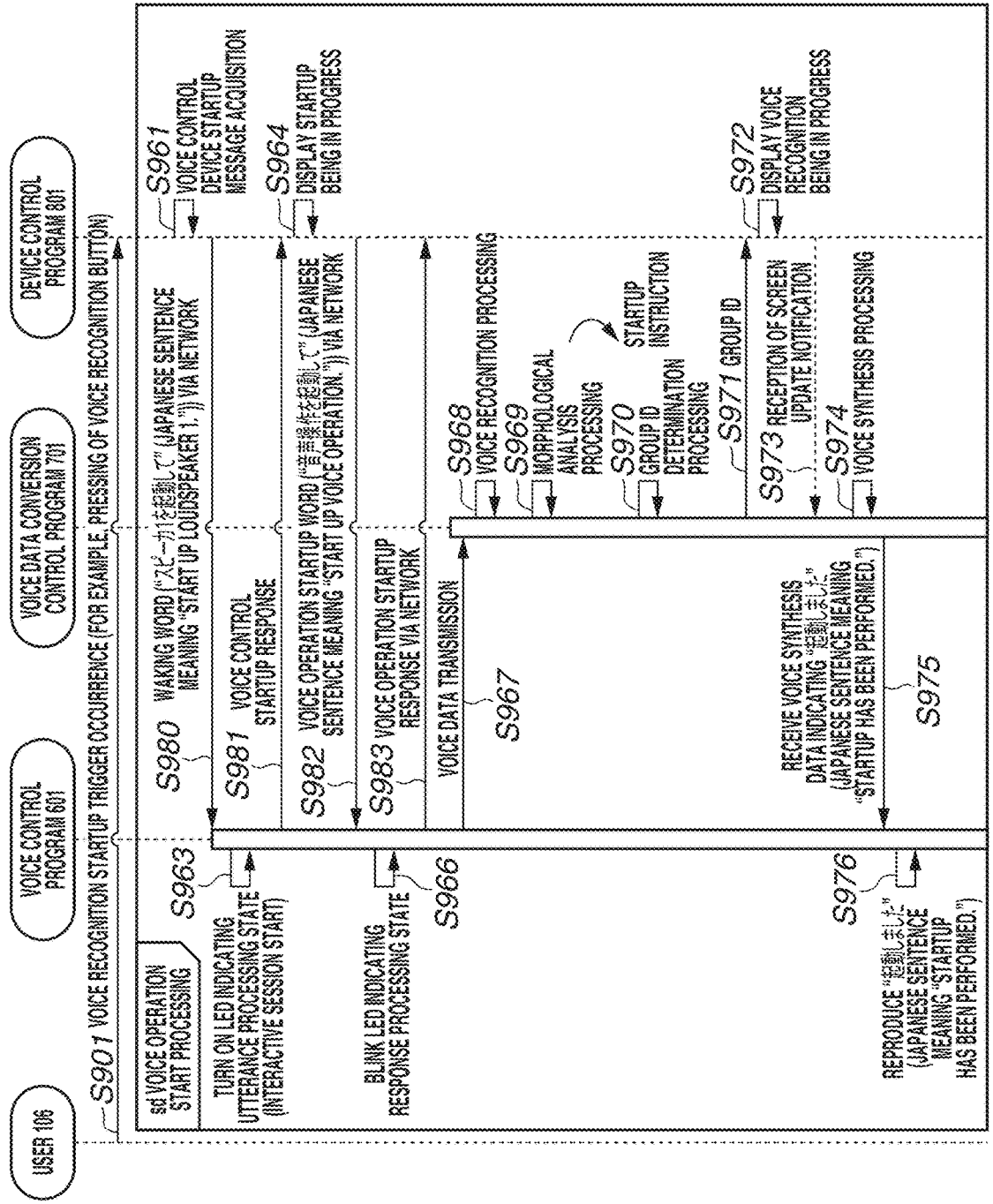
FIG. 9C is a diagram illustrating a startup sequence performed between devices that constitute the voice recognition system according to a second exemplary embodiment.

As described above, performing processing illustrated in the sequence diagram of FIG. 9C enables startup of the voice control device and starting of a voice operation via the network 104 without using outputting of a voice from the loudspeaker of the image forming apparatus. Since outputting of a voice from the loudspeaker of the image forming apparatus is not used for starting up the voice control device 100, even if the voice control device 100 and the image forming apparatus 101 are distant from each other, it becomes possible to start up a voice operation in the second exemplary embodiment. Since it becomes possible to perform a voice operation on the image forming apparatus 101 in a state in which a voice control device is located near the client terminal 103 which the user 106 is operating, it becomes possible to remotely perform an output operation for a print job received as a printing instruction from the client terminal 103.

Each of the above-described exemplary embodiments can also be implemented in the form of processing for supplying a program for implementing one or more functions to a system or apparatus via a network or storage medium and causing one or more processors included in a computer of the system or apparatus to read out and execute the program. Moreover, each of the above-described exemplary embodiments can also be implemented by a circuit which implements one or more functions (for example, an application specific integrated circuit (ASIC)).

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-214509 filed Nov. 27, 2019, which is hereby incorporated by reference herein in its entirety.

What is claimed is:

1. An information processing apparatus that outputs a voice command, communicating with an input-output device capable of voice input/output, the input-output device receives the voice command, and communicating with a server that analyzes the voice command, the information processing apparatus comprising:
   a speaker configured to output a voice;
   an operation panel configured to receive a user operation for starting the input-output device; and
   a controller configured to perform control to, in response to the user operation received by the operation panel, cause the speaker to output a waking word for starting the input-output device.

2. The information processing apparatus according to claim 1, wherein the controller performs control to cause the speaker to output, following the waking word, a voice operation startup word for starting a voice operation service of the information processing apparatus provided by the server.

3. The information processing apparatus according to claim 2,
   wherein the input-output device transmits voice data corresponding to the voice operation startup word to the server, and the server transmits start data indicating starting of the voice operation service in response to the voice data, and
   wherein the controller is configured to further function as:
      a communication unit configured to receive the start data from the server; and
      an execution unit configured to perform a voice operation via the input-output device in response to the start data.

4. The information processing apparatus according to claim 1, further comprising a display configured to display information, wherein the controller is configured to further function as a state display unit configured to cause the display to display a state of the input-output device.

5. The information processing apparatus according to claim 4, wherein the state display unit causes the display to display information indicating that startup of the input-output device is in progress.

6. The information processing apparatus according to claim 1,
   wherein the input-output device inputs an operation word for operating the information processing apparatus and outputs voice data corresponding to the input operation word to the server, and the server transmits, to the information processing apparatus, information for operating the information processing apparatus based on a result of analysis of the voice data, and
   wherein the controller is configured to further function as a processing unit configured to perform processing according to the information received from the server.

7. The information processing apparatus according to claim 6, further comprising a display configured to display information,
   wherein the processing unit is a display control unit configured to cause the display to display information according to the information received from the server.

8. The information processing apparatus according to claim 7, further comprising a printing device,
   wherein, when an operation word indicating using of the printing device is input to the input-output device, the display controller causes the display device to display a print setting screen indicating setting of printing to be performed by the printing device.

9. The information processing apparatus according to claim 6, further comprising a printing device,
wherein the processing unit is a printing control unit configured to cause the printing device to perform printing according to the information received from the server.

10. A startup method for an input-output device, the startup method being performed by an information processing apparatus that outputs a voice command, communicates with the input-output device capable of voice input/output, the input-output device receiving the voice command, and communicates with a server, the startup method comprising:
receiving a user operation for starting the input-output device in the information processing apparatus; and
causing, in response to the received user operation, a speaker of the information processing apparatus to output a waking word for starting the input-output device.

11. An information processing apparatus that outputs a voice command, communicates with an input-output device capable of voice input/output, the input-output device receives an input voice, and communicates with a server, the information processing apparatus comprising:
a communication interface configured to perform communication with the input-output device via a network;
an operation panel configured to receive a user operation for starting the input-output device; and
a controller configured to control the communication interface to, in response to the user operation received by the operation panel, output, to the input-output device, a waking instruction corresponding to a waking word for starting the input-output device.

12. The information processing apparatus according to claim 11, wherein the controller controls the communication interface to output, following the waking instruction, a startup instruction for starting a voice operation service of the information processing apparatus provided by the server.

13. The information processing apparatus according to claim 12,
wherein the input-output device transmits voice data corresponding to the startup instruction to the server, and the server transmits start data indicating starting of the voice operation service in response to the voice data, and
wherein the controller is further configured to function as an execution unit configured to perform a voice operation via the input-output device in response to the start data received by the communication interface.

14. The information processing apparatus according to claim 11, further comprising a display configured to display information, wherein the controller is further configured to function as a state display unit configured to cause the display to display a state of the input-output device.

15. The information processing apparatus according to claim 14, wherein the state display unit cause the display to display information indicating that startup of the input-output device is in progress.

16. The information processing apparatus according to claim 11,
wherein the input-output device inputs an operation word for operating the information processing apparatus and outputs voice data corresponding to the input operation word to the server, and the server transmits, to the information processing apparatus, information for operating the information processing apparatus based on a result of analysis of the voice data, and
wherein the controller is further configured to function as a processing unit configured to perform processing according to the information received from the server.

17. The information processing apparatus according to claim 16, further comprising a display configured to display information,
wherein the processing unit is a display control unit configured to cause the display to display information according to the information received from the server.

18. The information processing apparatus according to claim 17, further comprising a printing device,
wherein, when an operation word indicating using of the printing device is input to the input-output device, the display control unit causes the display to display a print setting screen indicating setting of printing to be performed by the printing device.

19. The information processing apparatus according to claim 16, further comprising a printing device,
wherein the processing unit is a printing control unit configured to cause the printing device to perform printing according to the information received from the server.

* * * * *